United States Patent [19]

Budzyna et al.

[11] Patent Number: 5,154,940
[45] Date of Patent: Oct. 13, 1992

[54] METHOD FOR RAPIDLY HEATING OR COOKING A FOOD PRODUCT

[75] Inventors: W. James Budzyna, Whitinsville; David J. Howe, Milford; William A. Johnson, Holliston, all of Mass.; Gregory J. McCabe, Hooksett, N.H.

[73] Assignee: The Procter & Gamble Company, Cincinnati, Ohio

[21] Appl. No.: 579,224

[22] Filed: Sep. 5, 1990

Related U.S. Application Data

[63] Continuation of Ser. No. 344,167, Apr. 27, 1989, abandoned.

[51] Int. Cl.$^5$ .................... B65D 81/34; A23L 1/01
[52] U.S. Cl. .................... 426/232; 426/394; 426/405; 426/406; 426/407; 426/523
[58] Field of Search .............. 426/405, 406, 407, 394, 426/523; 99/348, 483, 469

[56] References Cited

U.S. PATENT DOCUMENTS

| | | | |
|---|---|---|---|
| Re. 31,833 | 2/1985 | Loeffler et al. | 99/348 |
| 2,762,289 | 9/1956 | Crutcher, Jr. | 99/469 |
| 3,287,140 | 11/1966 | Brussell . | |
| 3,446,636 | 5/1969 | Kraus | 426/405 |
| 3,759,721 | 9/1971 | Hawley | 426/113 |
| 3,870,193 | 3/1975 | Schneider | 221/150 |
| 4,137,333 | 1/1979 | Daswick | 426/120 |
| 4,155,294 | 5/1979 | Langhammer et al. | 99/427 |
| 4,375,184 | 3/1983 | Gilliom | 99/422 |
| 4,397,875 | 8/1983 | Gilliom | 426/523 |
| 4,438,683 | 3/1984 | Bartfield | 99/330 |
| 4,479,776 | 10/1984 | Smith | 432/144 |
| 4,491,065 | 1/1985 | Poulson | 99/327 |
| 4,523,391 | 6/1985 | Smith et al. | 34/225 |
| 4,540,588 | 9/1985 | Bartfield | 426/231 |
| 4,646,627 | 3/1987 | Bartfield et al. | 99/330 |
| 4,746,060 | 5/1988 | Morehouse | 426/122 |
| 4,831,238 | 5/1989 | Smith et al. | 219/400 |
| 4,835,351 | 5/1989 | Smith et al. | 219/10.55 R |
| 4,949,879 | 8/1990 | Mariotti | 222/413 |
| 4,965,435 | 10/1990 | Smith et al. | 219/388 |

FOREIGN PATENT DOCUMENTS

| | | |
|---|---|---|
| 0168985 | 1/1986 | European Pat. Off. . |
| 7210960 | 6/1973 | Netherlands . |
| 132735 | 1/1964 | New Zealand . |
| 1386635 | 3/1975 | United Kingdom . |
| WO-A-8604978 | 8/1986 | World Int. Prop. O. . |
| WO88/02999 | 5/1988 | World Int. Prop. O. . |

OTHER PUBLICATIONS

Article from: Adweek's Marketing Week, entitled "New Product Watch, Housewares to Change America's Kitchen", Feb. 6, 1989, p. 17.

Primary Examiner—Steven Weinstein
Attorney, Agent, or Firm—Michael E. Hilton; E. Kelly Linman; Kevin C. Johnson

[57] ABSTRACT

Method of and apparatus for heating or cooking a food product packaged within a container by using heated air. The oven apparatus includes a substantially closed-loop heated air system that starts with a blower that blows air into a heating barrel where a heating element heats the air to a high temperature. The heated air exits the heating barrel, passes through an air flow channel in the oven's door, and enters the oven's heating chamber. The heated air passes through the container inside the heating chamber and heats the food product within the container. In a preferred embodiment of the invention, the heating chamber is rotated while the heated air passes through the container to tumble the food product and ensure even heating thereof. The air exiting from the food product container enters a recirculation chamber which directs the air back into the blower to repeat the cycle. Heated air is recirculated through the food product container for either a fixed period of time, or until the temperature of the air exiting from the container reaches a predetermined value. In a preferred embodiment of the invention, the oven includes a central processing unit that is programmed to control the oven's overall operation based on signals received from various transducers, e.g., a door switch, various temperature sensors, an air flow switch, and product-in switch. Also disclosed are various embodiments of containers that are particularly adapted for heating food products by utilizing the oven apparatuses of the present invention.

21 Claims, 14 Drawing Sheets

OVEN INTERFACE BOARD 120

OVEN CONTROL BOARD 140

Fig. 10 OPERATIONAL STATE

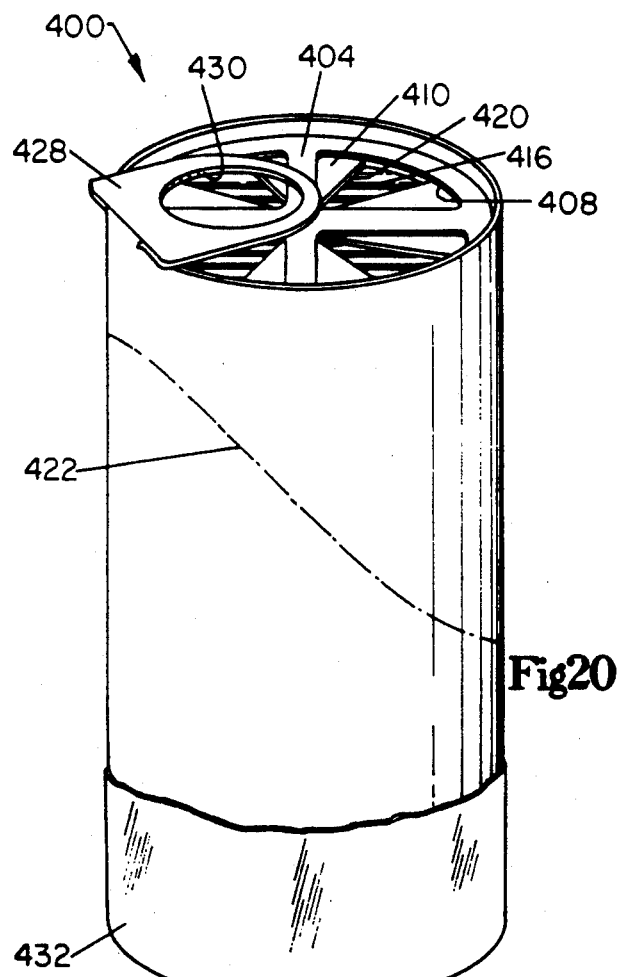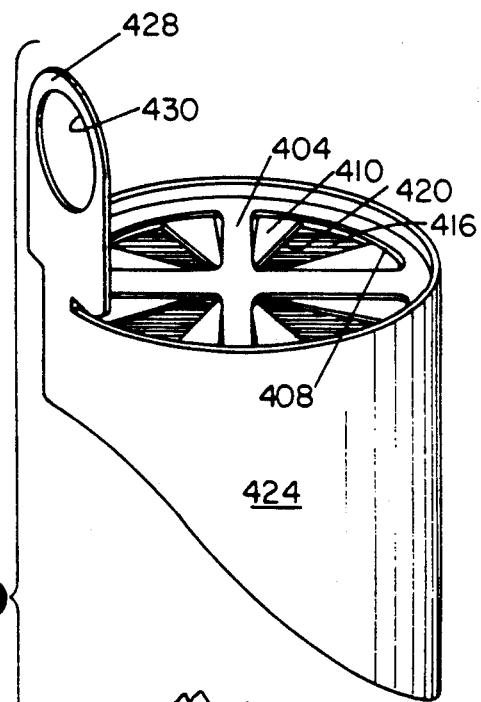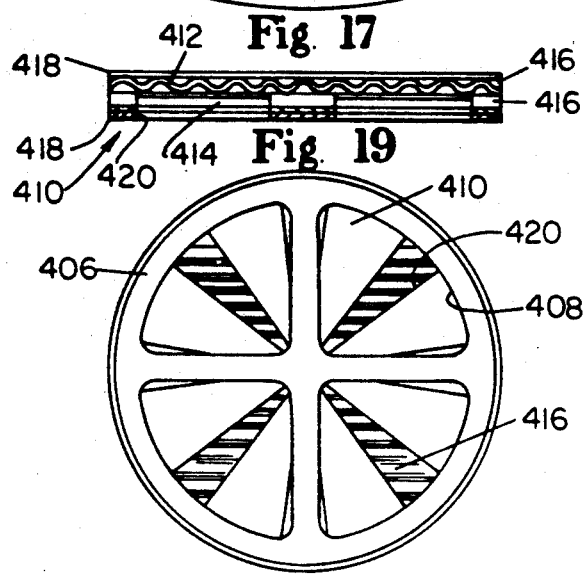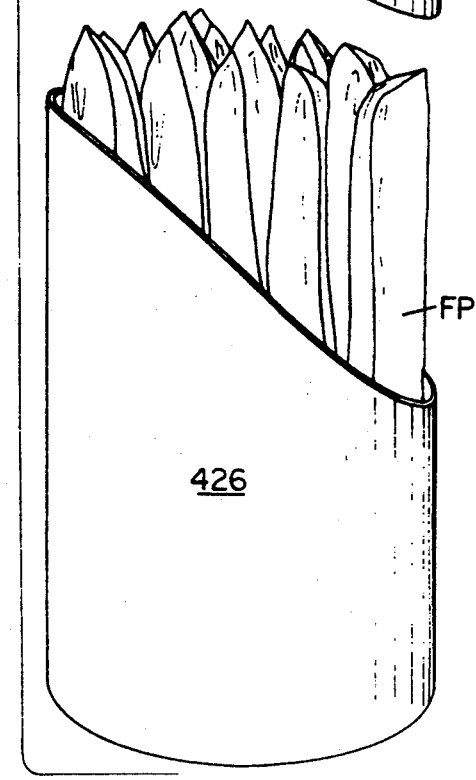
Fig. 17
Fig. 18
Fig. 19
Fig. 20

METHOD FOR RAPIDLY HEATING OR COOKING A FOOD PRODUCT

This is a continuation of application Ser. No. 344,167, filed on Apr. 27, 1989, now abandoned.

TECHNICAL FIELD

The present invention relates to methods of and apparatuses for rapidly heating or cooking food products, and more particularly relates to methods of and apparatuses for heating or cooking food products by using heated air.

BACKGROUND OF THE INVENTION

In recent years there has been an ever increasing demand for food products that can be prepared in a relatively short period of time in consumers' homes and various retail establishments such as so-called "fast food" restaurants. One particular group of popular foods is deep-fried foods such as french fries, battered vegetables such as onion rings, mushrooms, zucchini, etc., and battered meats such as fish sticks and patties, chicken nuggets, etc. In a typical commercial deep-frying operation, a large quantity of the food product is removed from its bulk shipping container and placed within a wire mesh basket that is lowered into a large vat of hot cooking oil or grease. After the food product has been immersed in the hot oil for several minutes, the basket is removed from the vat and set aside to allow the food product to cool and excess oil to drain therefrom. Individual servings of the food product are then placed within containers which are typically open-ended cardboard pouches for french fries, or closable card-board boxes for fish and chicken parts. Generally speaking, most people find food products prepared and packaged in this fashion to be very satisfactory.

There have been numerous attempts at making deep-fried food products available at places other than restaurants such as consumers' homes, convenience stores, vending machine canteens, cafeterias, etc. However, it has been found that providing and maintaining the necessary reservoir of hot oil presents many major problems. For example, the hot oil may splatter when the food product is immersed therein which not only creates a mess but can fall on the operator's skin and cause a burn. Also, the oil can sometimes become too hot and possibly ignite. Furthermore, the oil must be changed frequently due to contamination and spoilage. Finally, the fumes emitted from the cooking oil should be vented, preferably to the outside atmosphere, which requires additional equipment and associated costs.

Another common method of heating or cooking food products is to simply place the food on a pan or similar utensil and place it within a conventional oven. However, the food product's unexposed surfaces, i.e., the surfaces that touch the pan or one another, are not in direct contact with the hot air and consequently the food is not evenly cooked or crisped. A common solution to this problem involves periodically opening the oven's door and moving the food product around in the pan. However, this method is time consuming and therefore impractical, particularly in a restaurant or convenience store environment where labor costs are of primary concern. Moreover, each time the oven door is opened, a considerable amount of the hot air escapes, which drives up energy costs and significantly increases the already lengthy cooking time.

Another known method of heating or cooking food products involves using microwave ovens, which have become very popular in consumer's home and retail establishments primarily because the oven's cooking time is typically very short. While the microwave oven has proved to be imminently satisfactory for rapidly heating many different types of food products, it is apparently not entirely suitable for cooking other types of food products, most notably foods that are typically deep-fried such as french fries. Indeed, most french fries that are prepared by using a microwave oven turn out to be rubber, lack crispness and good texture, and are generally wholly unacceptable.

Others have recognized a need for an oven apparatus that can be used to cook a food product such as french fries in a convenient and rapid manner. For example, U.S. Pat. No. 3,870,193 to Schneider; U.S. Pat. No. 4,155,294 to Langhammer et al.; and U.S. Pat. No. 4,491,065 to Poulson disclose various ovens for heating and dispensing french fries that generally include a rotatable cage that is filled with fries which are cooked by passing heated air through the cage. However, it has been found that this general type of oven is somewhat inconvenient and unsanitary to use because it must be manually loaded with fries from a bulk source, and manually unloaded. In addition, since the fries come into direct contact with the cage, the cage must be regularly cleaned and sanitized. Finally, in the case of the Schneider oven, a relatively complicated and presumably expensive drive system is included that moves the heating cage between a loading position, a heating position, and a delivery position.

Another type of oven is disclosed in U.S. Pat. Nos. 4,375,184 and 4,397,875 both to Gilliom. This oven heats french fries by essentially blowing hot air on the fries while they rest on top of a tray-type container. However, it has been found that this general type of oven and receptacle arrangement does not produce acceptable fries. Specifically, since the fries remain piled up on top of one another during the heating process, the fries become overly crisped in areas that are exposed to the heated air and essentially raw in areas that are in contact with the receptacle or with an adjacent fry.

A major concern associated with heating foods such as pre-cooked french fries that is not adequately addressed by prior attempts including the ovens discussed above is the fumes generated during the heating process. Generally speaking, when pre-cooked fries are initially prepared, oil is used which leaves a residual amount of oil on the fry's outer surfaces. When the fries are heated with hot air, some of the surface oil's more volatile elements vaporize with some undergoing partial combustion. These smoke-like gaseous and particulate products inevitably accumulate on the inner surfaces of the oven and therefore require the oven to be frequently cleaned and maintained. If the fumes are simply vented outside the oven as most known ovens suggest, the room rapidly becomes filled with fumes which can leave a film of oil on the room's walls, floor, and ceiling and can also leave an odor that can last for several days.

In light of the above, the principle object of the present invention is to provide a method of and apparatus for heating or cooking various food products in a relatively short period of time such that they are appetizing and have good texture and appearance.

Another principle object of the present invention is to provide a fast, efficient, and sanitary method of and apparatus for heating/cooking various food products without having to remove the food from its shipping container.

Another principle object of the present invention is to provide a method of and apparatus for rapidly heating a food product in a container while ensuring even heating of the food.

Yet another object of the present invention is to provide a method of and apparatus for heating a food product wherein the product does not come into direct contact with any of the apparatus' internal components.

A further object of the present invention is to provide a method of and apparatus for heating a food product that includes a control system that compensates for the initial state of the oven and the food product, e.g., chilled or frozen.

SUMMARY OF THE INVENTION

The oven apparatus of the present invention is particularly adapted for heating or cooking a food product inside a container by using heated air. In one embodiment of the present invention, the oven has an outer housing that includes a bottom tray, a body section, a back panel, and a front panel. A door is hingedly attached to the oven's front panel and provides access to the oven's heating chamber.

The oven apparatus includes a substantially closed-loop heated air system that starts with a blower that blows air into a heating barrel where a heating element heats the air to a high temperature. The heated air exits the heating barrel, passes through an air flow channel in the oven's door, and enters the oven's heating chamber. The heated air passes through the container that has been inserted into the heating chamber and heats the food product inside the container. In a preferred embodiment of the present invention, the heating chamber is rotated while the heated air passes therethrough to tumble the food product inside the container and ensure even heating thereof.

The air exiting from the food product container enters a recirculation chamber which directs the air back into the blower to repeat the cycle. In one embodiment of the present invention, heated air is recirculated through the food product container for a fixed, predetermined period of time. In a preferred embodiment of the present invention, the heated air is circulated through the food product container until the temperature of the air exiting the container reaches a certain predetermined value. In a particularly preferred embodiment of the present invention, the heated air is circulated through the food product container until the total amount of heat absorbed by the food product reaches a certain predetermined value.

In a preferred embodiment of the present invention, the oven apparatus includes a central processing unit that is programmed to control the oven's overall operation based on input signals received from various transducers, e.g., a door switch, an operator start switch, several temperature sensors, an air flow switch, and a product-in switch.

Also disclosed herein are various embodiments of containers that are particularly adapted for heating food products by utilizing the oven apparatuses of the present invention.

BRIEF DESCRIPTION OF THE DRAWINGS

While the specification concludes with claims that particularly point out and distinctly claim the subject matter regarded as forming the present invention, it is believed that the invention will be better understood from the following detailed description with reference to the drawings in which:

FIG. 17 is a perspective view of a preferred container that is particularly adapted for heating a food product contained therein by utilizing the oven apparatus of the present invention;

FIG. 18 is a bottom view of the container illustrated in FIG. 17;

FIG. 19 is a cross-sectional side view of the filter element that is attached to the inner surface of the top and bottom end panels of the container illustrated in FIG. 17;

FIG. 20 is a perspective view of the container illustrated in FIG. 17 shown after it has been opened;

DETAILED DESCRIPTION OF THE INVENTION

In the following detailed description of the present invention, the terms "cook", "cooking" and "cooked" are intended to relate to a process wherein an essentially raw food product is subjected to a high temperature medium for the time period necessary to render the food product suitable for human consumption. The terms "heat", "heating", and "heated" are intended to relate to a process wherein an essentially pre-cooked or partially cooked food product is subjected to a high temperature medium for the time period necessary to complete the cooking process, or to bring the food product up to a temperature at which the food is typically consumed. However, it should be understood that the oven apparatus of the present invention can be used to either "cook" or "heat" a food product and therefore the terms are used synonymously herein. In addition, although the following detailed description makes occasional reference to heating french fries, it is to be fully understood that the oven apparatuses of the present invention can be used to heat virtually limitless types and varieties of food products in general. Finally, some of the oven apparatus's various internal components such as frame members, bearings, fasteners, wiring, control circuitry and the like are not entirely shown in the Figures or described in great detail in order to simplify and more clearly disclose the present invention, it being understood that such details are well within the knowledge of those skilled in the art of oven design.

OVEN APPARATUS

With reference to the drawings wherein the same numeral is used to indicate common apparatus and workpiece components, FIGS. 1-4 show various views of one embodiment of an oven apparatus of the present invention generally indicated as 10 that is particularly suited for heating various food products packaged within a container without having to remove the product from the container. Exemplary containers that are particularly adapted for heating food products by using the oven apparatuses of the present invention are illustrated in FIGS. 13-23 and described in detail later herein.

Figure 1:
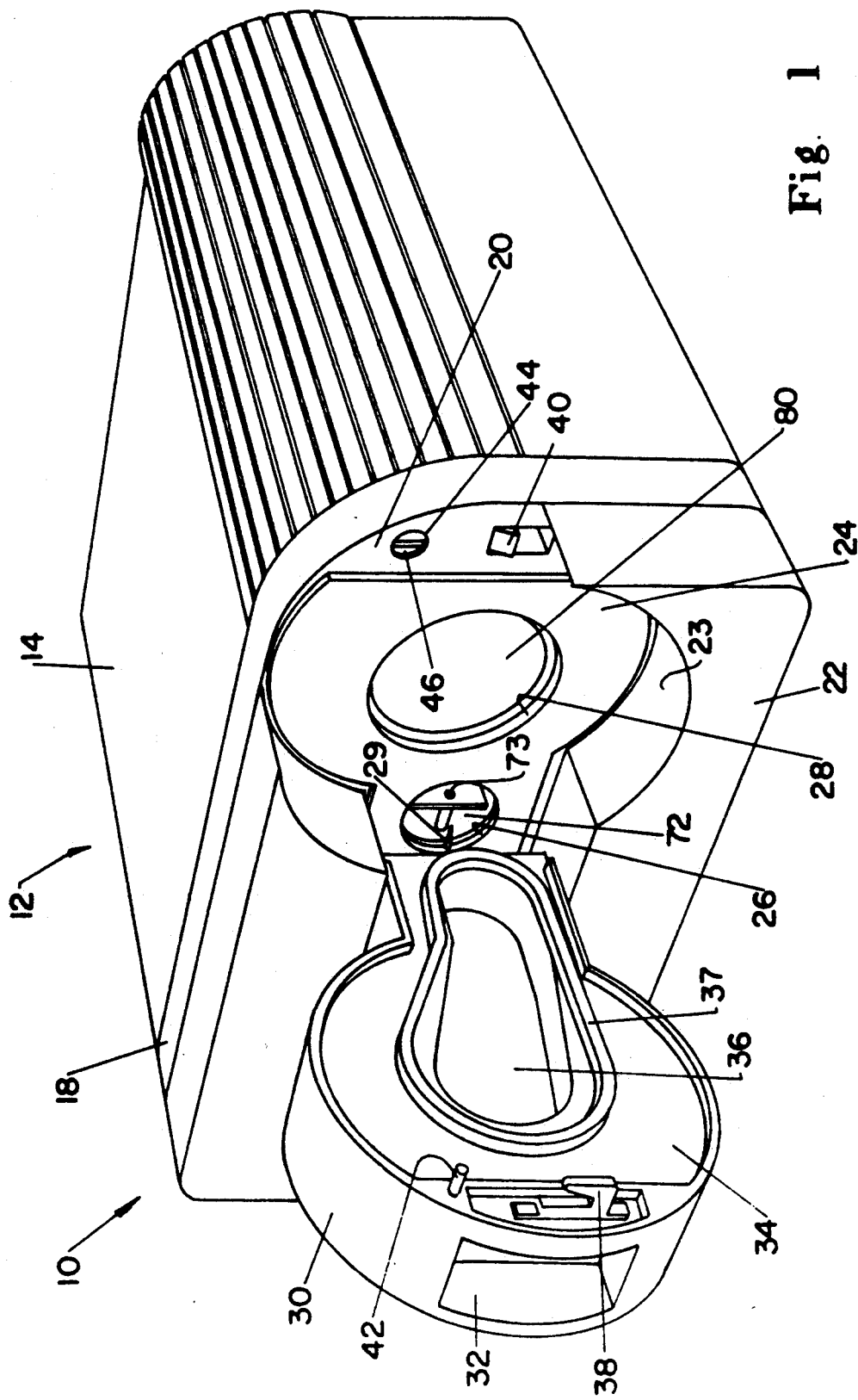
FIG. 1 is a perspective view of one embodiment of an oven apparatus of the present invention shown with its door in its open position.
Figure 2:
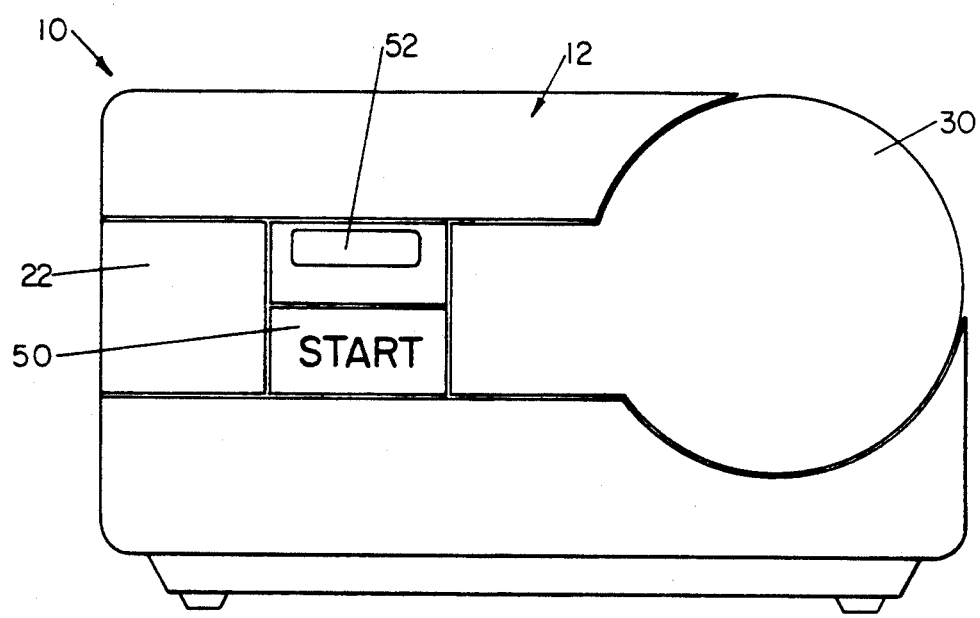
FIG. 2 is a front elevation view of the oven apparatus the illustrated in FIG. 1.
Figure 3:
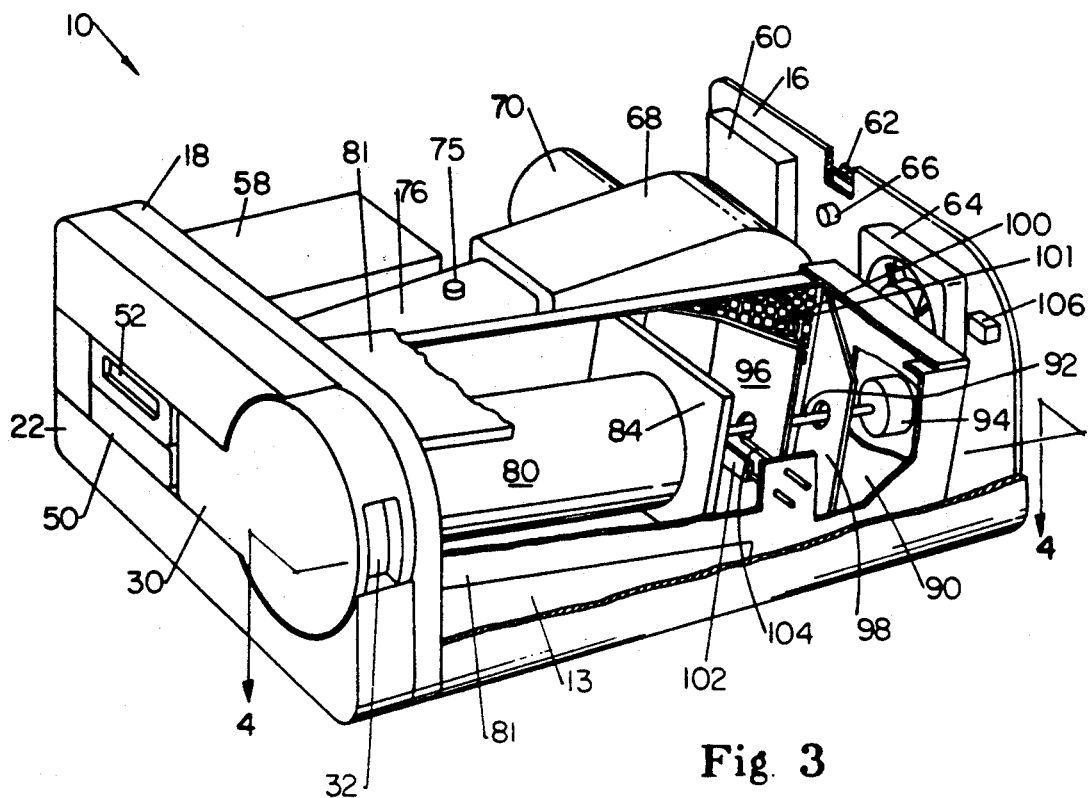
FIG. 3 is a schematic perspective view of the oven apparatus illustrated in FIG. 1 shown with its outer housing and various internal shrouds removed or partially cut away to show greater detail.

First referring to FIGS. 1, 2, and 3, oven 10 includes outer housing generally indicated as 12 that includes bottom tray 13 (FIG. 3), body section 14 which is attached to bottom tray 13, and back panel 16 (FIG. 3) which is secured to the rear of body section 14 and bottom tray 13. Bezel 18 is attached to the front of body section 14, face plate 20 is attached to bezel 18, and front panel 22 is attached to face plate 20. Protective plate 24, which is preferably made of a ceramic material, is secured to the outer surface of face plate 20. Protective plate 24 is provided with small aperture 26 that allows heated air generated within heating barrel 72 to pass therethrough, and with loading aperture 28 which provides access to heating chamber 80. First temperature sensor 29, which is part of the overall control circuitry of oven 10 that will be more fully described herein, projects radially into small aperture 26 of protective plate 24. First temperature sensor 29 is preferably a thermocouple such as that available from Omega, Type K, Part No. KTSS-116U.

Door 30 is attached to front panel 22 with a hinge which allows door 30 to be moved from its closed, heating position as shown in FIGS. 2 and 3 to its open, loading position as shown in FIG. 1. Door 30 is generally circular in shape and enters complementary-shaped recess 23 in front panel 22 to given oven 10 a sleek, attractive frontal view as seen in FIG. 2. Of course, door 30 and recess 23 in front panel 22 may be of any cooperating configuration.

Door 30 includes finger recess 32 which provides a convenient means for the operator to grasp door 30 and move it from its closed position as shown in FIGS. 2 and 3, to its open position as shown in FIG. 1, and back to its closed position. The inner surface of door 30 is lined with insert 34 that is preferably made from an insulating material such as 1.0" thick (2.54 cm) "Marinite" insulation that is impregnated with sodium silicate (water glass) and available from the Johns-Manville Corporation. Air-flow channel 36, which is part of the overall heated air ductwork system of oven 10, is cut into insert 34 and provides fluid communication between heating barrel 72 and heating chamber 80 as will be more fully described herein. In a preferred embodiment of the present invention, resilient gasket 37 is secured to the inner surface of insert 34 and configured such that it encompasses small aperture 26 and loading aperture 28 in protective plate 24 when door 30 is in its closed position.

Male door latch component 38, which is attached to the inner peripheral edge of door 30, cooperates with female door latch component 40 secured to face plate 20 to provide a means for securing door 30 in its closed, operating position. Exemplary male/female latch components 38 and 40 are those available from Southco, part number C3-05.

Oven 10 is preferably provided with means for ensuring that door 30 is in its closed position before the oven can be operated, said means being part of the overall control circuitry of oven 10 that will be described in greater detail herein. For example, door 30 is provide with switch post 42 that projects outwardly from the inner surface of door 30. When door 30 is in its fully closed position, switch post 42 enters switch aperture 44 in face plate 20 and engages door switch 46 that is secured to the back surface of face plate 20. An exemplary switch 46 is available from Unimax as part number 3TMT15-4.

Referring briefly now to front view FIG. 2, front panel 22 of oven 10 is provided with operating switch 50 which the operator presses to activate the oven's heating operation. In a preferred embodiment of the present invention, front panel 22 is provided with display screen and assembly 52 that visually displays information to the operator such as instructions, cooking time remaining, error signals, etc. An exemplary display screen and assembly is that available from Sonicor and designated as part number SSC16X2AEL.

Figure 4:
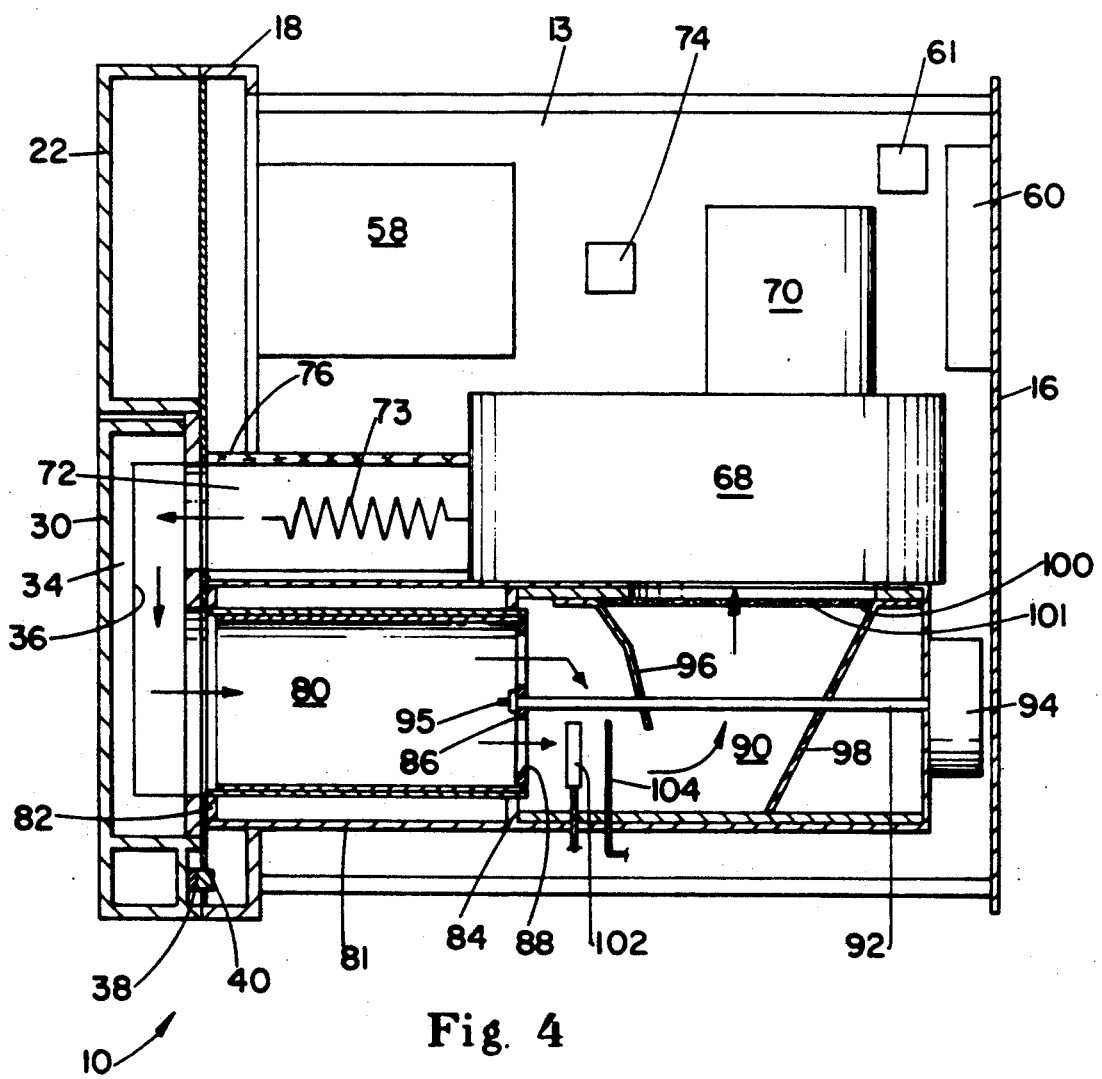
FIG. 4 is a schematic cross-sectional top view of the oven apparatus of the present invention taken along section line 4—4 of FIG. 3.

Referring now to FIGS. 3 and 4, which schematically illustrate the inner components of oven apparatus 10, central processing unit 58 (hereinafter referred to as "CPU 58") is secured to bottom tray 13 and is programmed to control the manner in which oven 10 operates by processing signals received from various transducers as will be described more fully herein. Power supply 60 is secured to back panel 16 and connected to standard 120/60 Hz voltage through on-off switch/circuit breaker 62, which is also secured to back panel 16. An exemplary power supply is that available from Power One and designated as part no. HTAA-16W, and an exemplary switch/circuit breaker is available from P&B and designated as part no. W67XZQ1-3-25 and rated at 25 amperes. Cooling fan 64, which is also attached to back panel 16, circulates air between the inside and outside of oven 10 through an aperture in back panel 16 to help maintain the interior of oven 10 at a suitable operating temperature. In a preferred embodiment, cooling fan 64 is operated through thermostat 66 set at, for example, 130° F. (54.5° C.)

The oven apparatuses of the present invention will adequately heat food products packaged within a container if they are provided with an open-loop heated air ductwork network, i.e., a network that simply exhausts the heated air outside the oven after it has passed through the container. However, as noted previously herein, it has been found that an open-loop heated air network is relatively inefficient since the incoming air must constantly be heated from its ambient temperature, which drastically increases the time necessary to heat the food product. Accordingly, the oven apparatuses of the present invention are preferably provided with a substantially closed-loop heated air system that recirculates heated air to rapidly heat food products placed therein. "Substantially closed-loop" is intended to identify a system that captures, reheats, and recirculates a substantial portion of the heated air that has been used to heat a food product rather than exhausting the heated air outside the oven.

The substantially closed-loop heated air system of oven 10 starts with blower 68, which can be of common "squirrel-cage" design, that is driven by blower motor 70, which preferably operates at 3000 r.p.m., 115 VAC. Blower 68 and motor 70 are preferably capable of moving at least 140 cubic feet per minute (cfm) unrestricted.

Still referring to FIGS. 3 and 4 and now in conjunction with FIG. 1, heating barrel 72 is located at the air exit end of blower 68 and in fluid communication therewith. Heating element 73, which operates through relay 74 controlled by CPU 58, is located within heating barrel 72 and also preferably operates on 120 VAC. An exemplary heating element 73 is available from Master and designated as part no. 30312, which is rated 1800 watts. Thermostat 75, which is mounted on top of and in contact with heating barrel 72, monitors the temperature of heating barrel 72 and prevents heating element 73 from overheating in the case of a blower and/or control failure. Heating barrel 72 is preferably wrapped with insulating material 76 which helps minimize the amount of heat loss into the interior of oven 10. Suitable insulating materials that can be used as insulating material 76 include "Cerablanket", which is available from the Johns-Manville Corporation.

The air exit end of heating barrel 72 terminates within small aperture 24 in protective plate 24, which is adjacent to and therefore in fluid communication with air flow channel 36 in insert 34 of door 30 when door 30 is in its closed, operating position. In a preferred embodiment of the invention, resilient gasket 37 that is attached to the inner surface of door 30 surrounds small aperture 24 and loading aperture 26 in protective plate 24 when door 30 is closed and thereby effectively reduces the amount of heated air that would otherwise be lost through the small gap between door 30 and protective plate 24 as the heated air travels between heating barrel 72 and heating chamber 80.

First temperature sensor 29 located within small aperture 26 in protective plate 24 provides a signal to CPU 58 that is proportional to the temperature of the air exiting heating barrel 72. CPU 58 constantly monitors this signal and when a predetermined value is exceeded, CPU 58 de-activates heating element 73 through heating element relay 74, and re-activates heating element 73 when the air temperature falls below a certain value. For example, it has been found that for heating a food product such as pre-cooked french fries in cartonboard containers to be described herein, good results are obtained if the heated air exiting heating barrel 72 is maintained at approximately 450° F. (232° C.). Suitable pre-cooked french fries for heating in this temperature range include those disclosed in U.S. Pat. Nos. 4,590,080 and 4,761,294, which are incorporated herein by reference.

Still referring to FIGS. 1, 3, and 4, rotatable heating chamber 80 is located within closed shroud 81 which is preferably made of a ceramic material. Heating chamber 80 is journaled inside apertures within support blocks 82 and 84 and is oriented such that its air inlet end terminates within loading aperture 26 in protective plate 24. The air exit end of heating chamber 80 is provided with hub 86 having large apertures 88 therein to provide fluid communication between the interior of heating chamber 80 and recirculation chamber 90, which is defined by support block 84 and the rear section of closed shroud 81.

It has been found that in heating various food products such as french fries by using heated air, best results are obtained when the food product is gently agitated or tumbled while the heated air is directed thereover to ensure even heating throughout. Accordingly, in a preferred embodiment of the present invention, oven 10 is provided with means for continuously or intermittently rotating heating chamber 80 while a food product is being heated therein. Such rotating means might include, for example, drive shaft 92 having one end connected to hub 86 and the other end connected to spinner motor 94. Motor 94 is preferably low-speed, e.g. rotates at 5-20 rpm, such as that available from Hurst and designated as part no. EA-6, which rotates at 6 rpm.

In a particular preferred embodiment of the present invention, oven 10 is provided with means for detecting whether a food product container has been inserted into heating chamber 80 before oven 10 can be operated. Exemplary detection means include spring-loaded switch 95, which is attached to the inner surface of hub 86, that sends a signal to CPU 58 when a food product container has been inserted into heating chamber 80. Another exemplary means would include a scanning device located adjacent to the inlet end of heating chamber 80, e.g. attached to door 30, or adjacent to the air exit end of heating chamber 80. In either case, the scanner would look for indicia secured to or printed on the food product container and if present, send a signal to CPU 58 that would indicate that a container had been inserted into heating chamber 80.

Heating chamber 80 and the container that is intended to be inserted therein are preferably shaped complementary to one another. For example, heating chamber 80 and the food product containers illustrated in FIGS. 13-23 are generally tubular-shaped. However, it is to be fully understood and appreciated that heating chamber 80 and the food product container may be of any complementary shape. In addition to being shaped complementary to the container, the internal cross-section of heating chamber 80 is preferably just slightly larger than the outer cross-section of the container to be placed therein in order to minimize the amount of heated air that can pass between the inner surface of the heating chamber and the outer surface of the container instead of passing through the container. In the particularly preferred embodiment of the present invention, heating chamber 80 is tapered from its loading end to its drive end to provide an interference fit and therefore good air seal between heating chamber 80 and the container. Of course, the difference between the chamber's and container's cross-sections should not be so small that it becomes difficult for the operator to insert the container into chamber 80 and retract it therefrom. Accordingly, a balance needs to be struck between maximum air flow through the container and ease of container insertion.

Still referring to FIGS. 3 and 4, recirculation chamber 90 includes baffles 96 and 98 which cooperate in directing the heated air exiting heating chamber 80 back into blower 68 through air inlet aperture 100 in shroud 81. Screen member 101 is preferably attached to the inner surface of shroud 81 such that is covers air inlet 100 to prevent large objects from entering and possibly damaging blower 68. In a preferred embodiment of the present invention, a metal mesh filter element such as those commonly used in range hoods may be used with or in lieu of screen member 101 to trap any residual particulates in the air stream.

In a preferred embodiment of the present invention, oven 10 is provided with means for detecting whether the air flow rate through the oven's ductwork system has fallen below a certain value due to an obstruction and if so, deactivating the oven until the obstruction is removed. For example, oven 10 is provided with air flow detection switch 102 which passes through shroud 81 and is located adjacent to the air exit end of heating chamber 80. When activated, air flow detection switch 102 sends a signal to CPU 58 which indicates that air is exiting from heating chamber 80. CPU 58 is programmed such that if blower 68 is activated for a certain period of time and switch 102 does not detect a predetermined minimum value of air flow, then CPU 58 deactivates heating element 73 and blower 68.

In a straightforward embodiment of the present oven, oven 10 is provided with means for circulating heated air through the food product container inserted within heating chamber 80 for a predetermined period. For example, CPU 58 is provided with timing programming that activates blower 68, heating element 73, and spinner motor 92 for, e.g., 2 minutes when operating switch 50 is pressed. This straightforward control circuitry is appropriate in situations where the oven is intended to be used to heat foods products that all have similar heating requirements. However, it has been found that the time necessary to appropriately heat various types of food products with air heated to a certain temperature can vary appreciably depending on various factors such as the initial state of the oven (hot/cold), the nature of the food product, its ambient temperature, whether it is frozen solid, partially frozen, or thawed, etc. It has been further found that there is a relation between the temperature of the heated air exiting heating chamber 80 and the degree to which the food product within the container has been heated. More specifically, when a container containing a refrigerated or frozen, raw or pre-cooked food product is inserted into heating chamber 80 and oven 10 is activated, the temperature of the heated air exiting from the container falls substantially below that of the heated air entering the container due to the amount of heat being absorbed by the food product. Then, as the food product heats up, the temperature of the air exiting the container rises. Accordingly, in a preferred embodiment of the present invention, oven 10 is provided with means for measuring the temperature of the air exiting from heating chamber 80, and terminating the heating process when a certain predetermined temperature value is reached. For example, second temperature sensor 104 is secured through an aperture in shroud 81 and positioned such that it is directly within the flow path of the air exiting from heating chamber 80. Second temperature sensor 104, e.g. thermocouple type K KTSS-116U available from Omega, sends an analog signal to CPU 58 that is proportional to the exit air temperature. When the indicated air temperature reaches a predetermined value, CPU 58 deactivates heating element 73 and blower 68 and indicates to the operator that the food product heating process is complete, e.g. by sending a signal to buzzer or horn 106. An exemplary buzzer 106 is a self-oscillating buzzer available from Projects Unlimited and designated as part no. AI-550.

In a particularly preferred embodiment of the present invention, CPU 58 is programmed to control the heating time based on the total amount of heat energy absorbed by the food product and terminating the heating process when a certain predetermined heat input is reached, which is represented by the equation:

$$Heat = k_1 \sim (T_i - T_3)dt - k_2 \sim (t_i - T_e)dt$$

where $k_1$ is the heat transfer coefficient of the overall system (oven, food product, and food product container), $k_2$ is the heat transfer coefficient of the oven and food product container, $T_i$ is the temperature of the heated air entering the heating chamber, and $T_e$ is the temperature of the heated air exiting the heating chamber.

Figure 5:
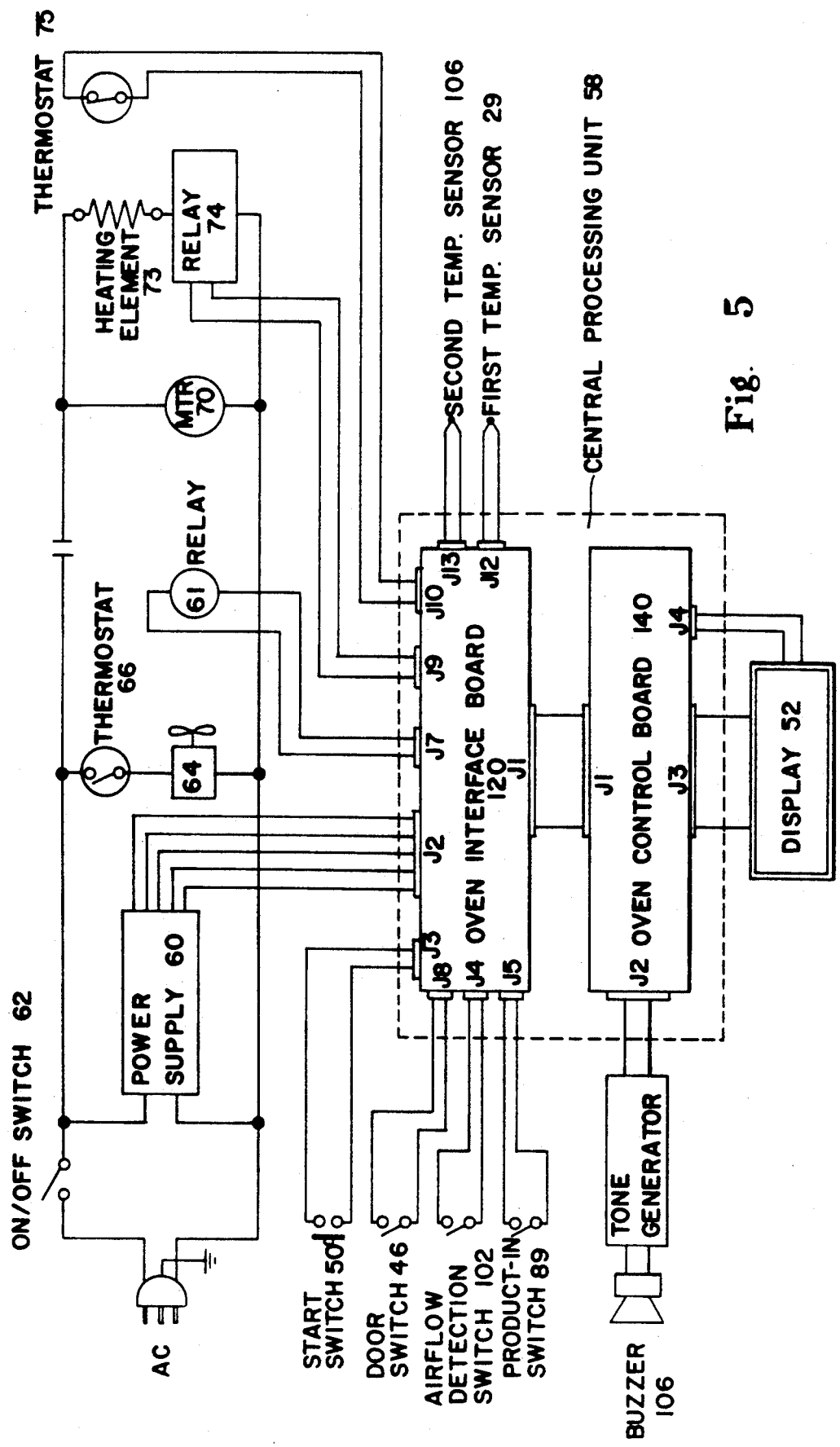
FIG. 5 is a schematic block wiring diagram of the oven apparatus of the present invention.
Figure 6:
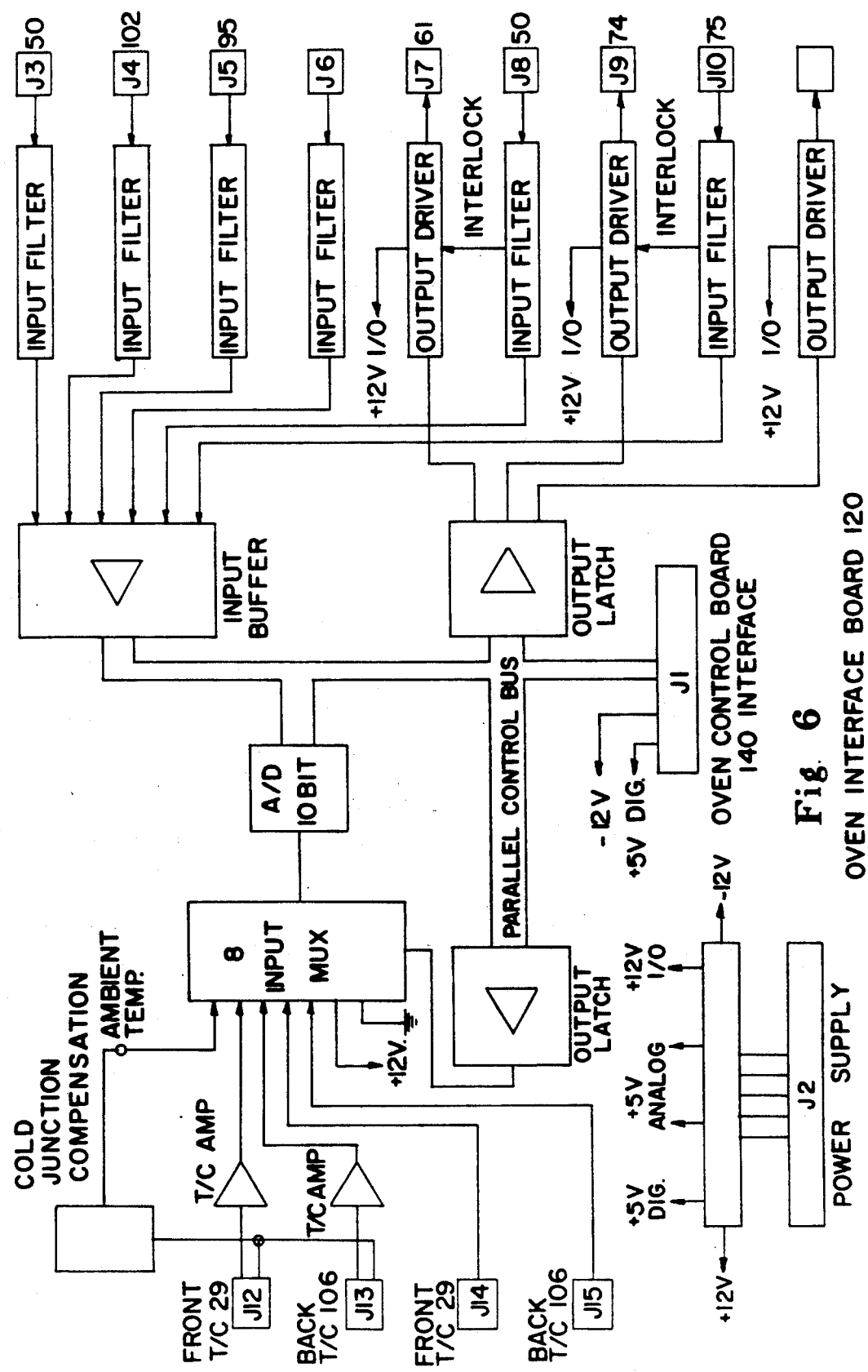
FIG. 6 is a schematic block diagram of the oven interface board component of the oven's central processing unit.
Figure 7:
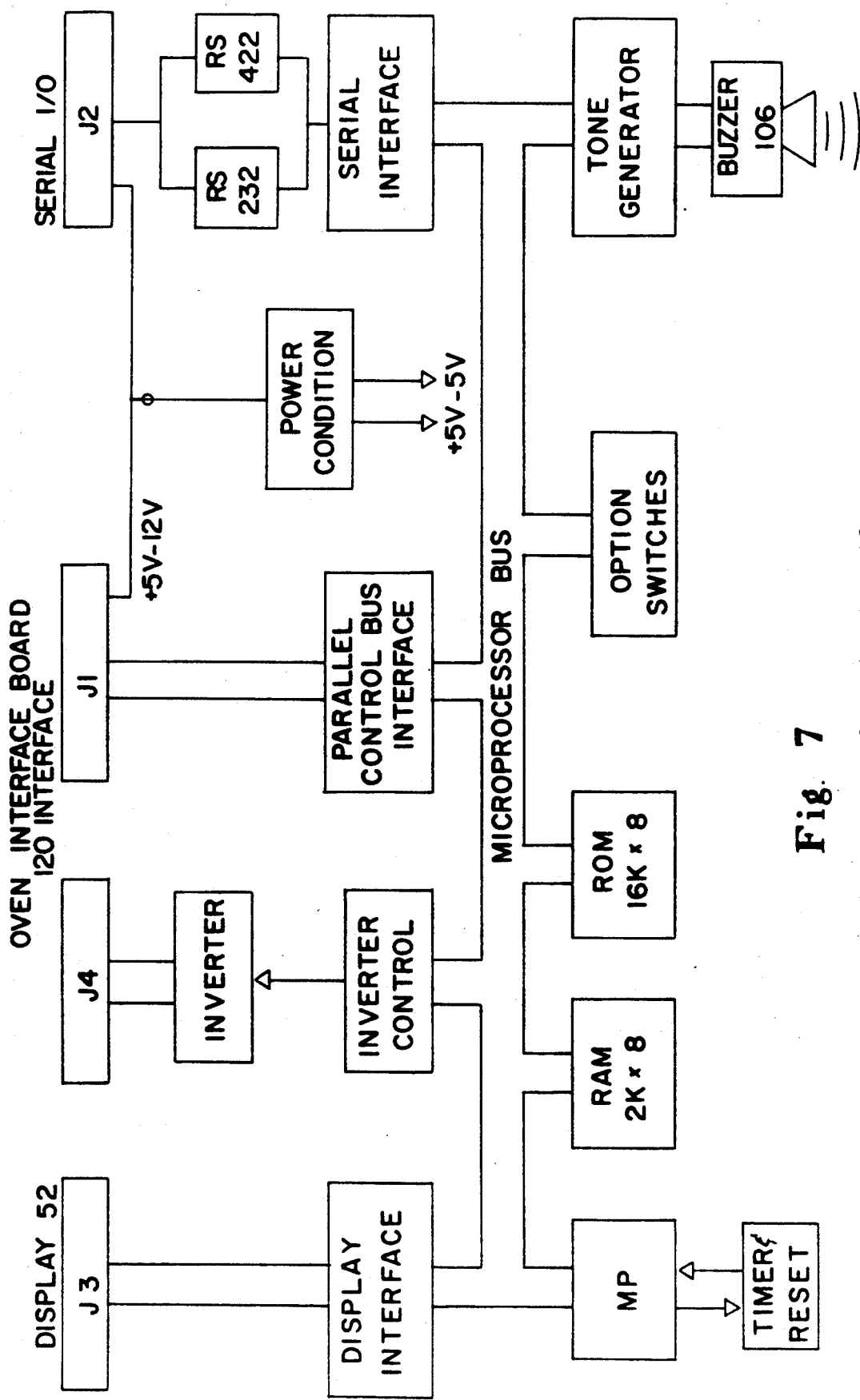
FIG. 7 is a schematic block diagram of the oven control board component of the oven's central processing unit.
Figure 8:
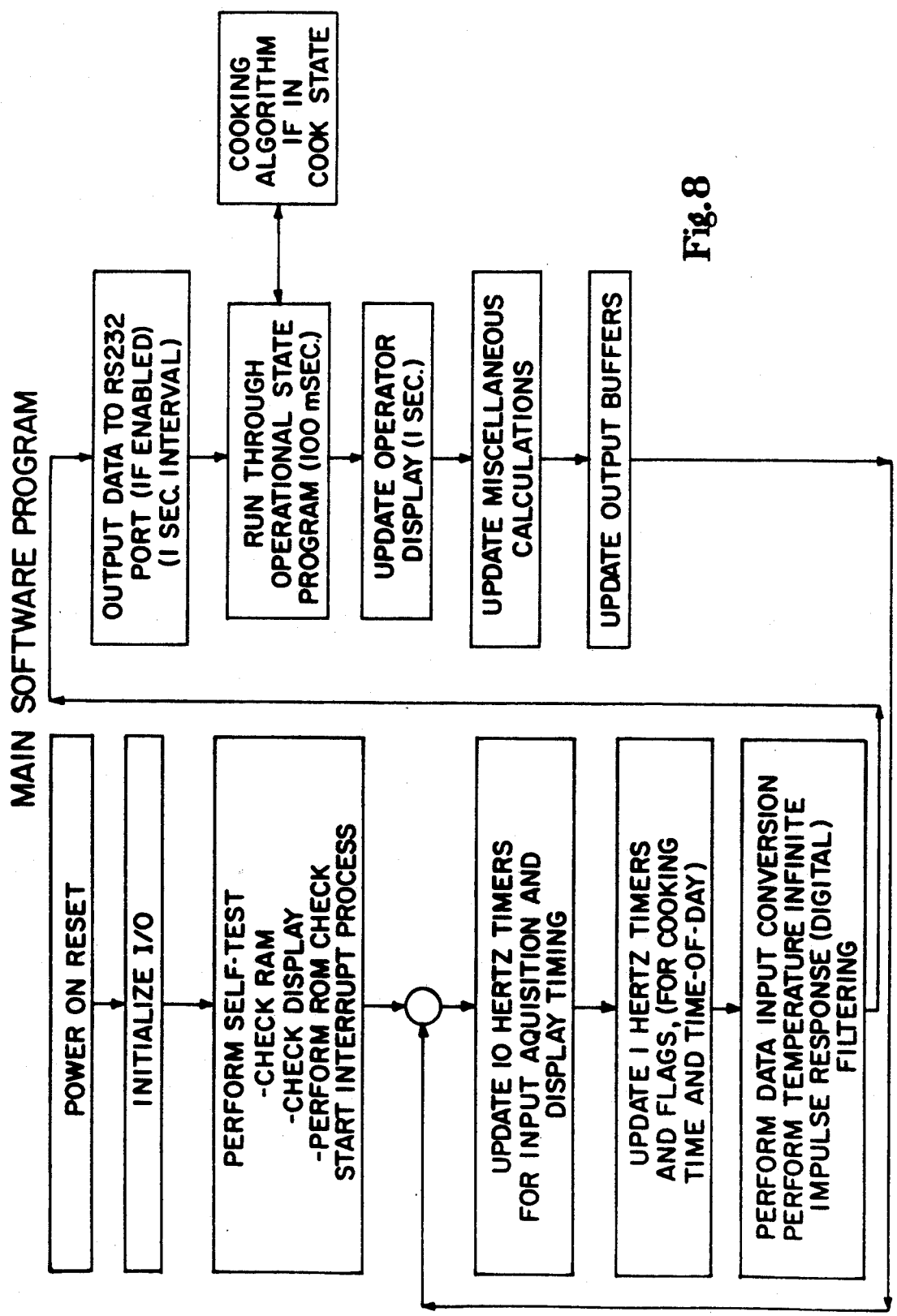
FIG. 8 is a schematic block diagram of the oven's main software program.
Figure 9:
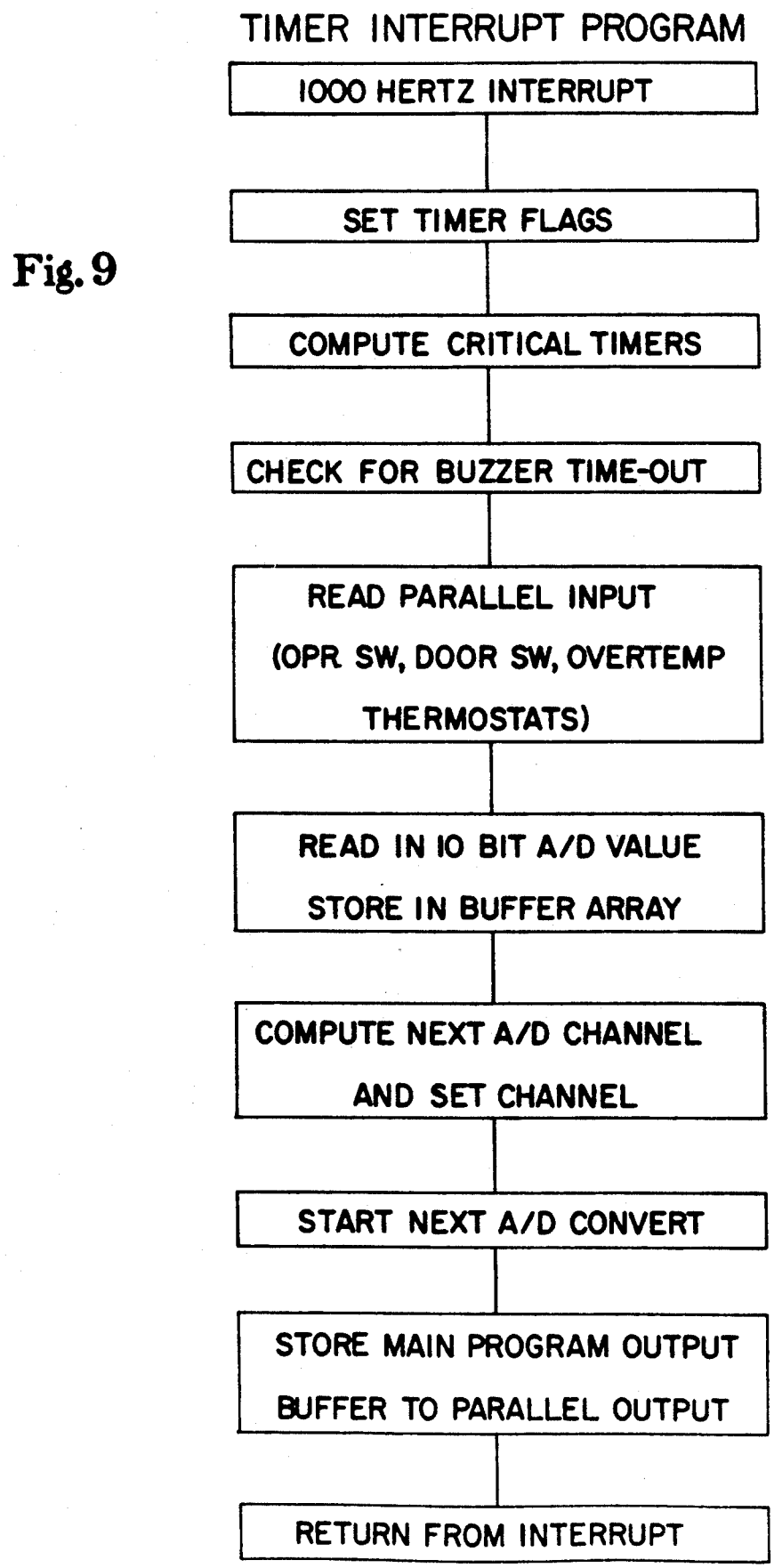
FIG. 9 is a schematic block diagram of the oven's timer interrupt software program.

Referring now to FIGS. 5-7, FIG. 5 is a schematic block wiring diagram of oven 10 of the present invention which shows how power supply 60, blower 68, heating element 73, etc. are electrically connected. FIG. 5 also shows CPU 58 that includes oven interface board 110, which is schematically block diagrammed in FIG. 6, and oven control board 112, which is schematically block diagrammed in FIG. 7. Oven control board 112 includes a microprocessor such as a Motorola MC 6809, 8 bit with 16 bit extensions, read only memory (ROM) 16K bytes, random access memory (RAM) 8K bytes. The program structure consists of a main (foreground) task supporting most tasks, a timer interrupt task for time-critical operations, and a RS232 interrupt task for data buffering. Most operations are performed in "C" language with time critical operations coded in assembly language. However, as those skilled in the art will by now realize, a microprocessor-based control system is not necessary for controlling oven apparatuses of the present invention when time and temperature values are essentially fixed as is the case when only one or two related types of food products are to be heated in the oven. However, the microprocessor control is preferred for ovens that are intended to be used for heating a wide variety of different food products since the heating variables and settings can be changed very quickly when a microprocessor is used.

Figure 10:
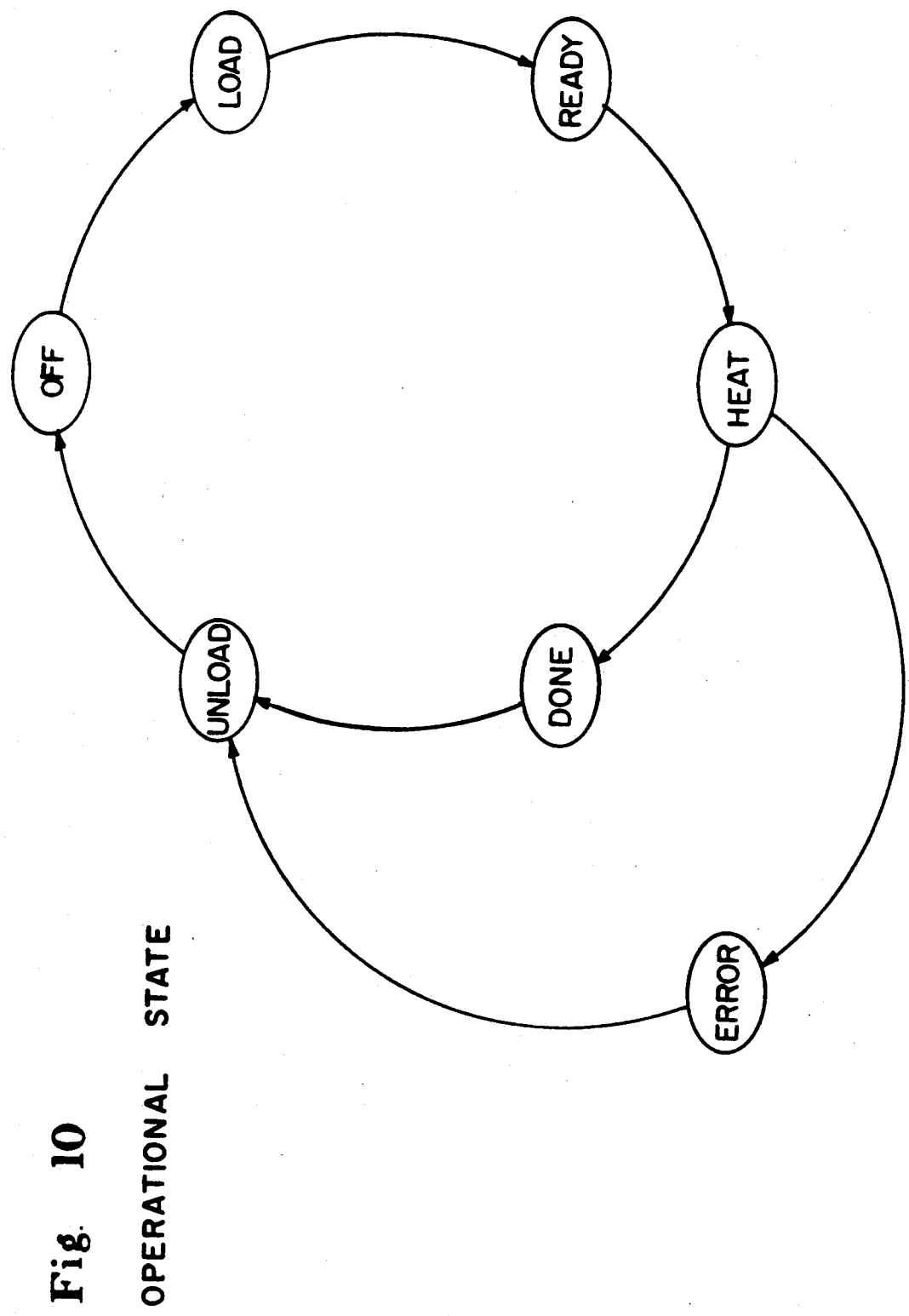
FIG. 10 is a schematic block diagram of the oven's operational state.

Referring now to software logic block diagrams 8-10 in conjunction with FIGS. 1-8, the operation of the preferred embodiment of oven 10 of the present invention is as follows: Beginning with "OFF" mode in FIG. 10, oven display 52 reads "Ready-Open Door". When the operator opens door 30, display 52 reads "Remove Outer Wrap—Insert Product" at which time the operator removes the outer wrap from the container, inserts the container into heating chamber 80, and closes door 30. When door 30 is closed as verified by door switch 46 and the container has been properly inserted into heating chamber 80 as verified by product-in switch 95, display 52 reads "Push Start". The operator then presses operating switch 50 which starts the oven's heating mode operation.

In heating mode, CPU 58 energizes heating element 73 through heating element control relay 74 which rapidly heats the air within heating barrel 72 to the desired, predetermined temperature, e.g., 450° F. (232° C.) for frozen, pre-cooked french fries. At the same time, CPU 58 energizes blower motor 70 which turns blower 68 and rapidly forces the heated air out of heating barrel 72. CPU 58 also energizes motor 92 which rotates heating chamber 80 and thereby gently tumbles the food product within the container.

First temperature sensor 29 located at the air discharge end of heating barrel 72 sends a signal to CPU 58 that is proportional to the air exiting therefrom. When the temperature of this air reaches a certain predetermined upper value, CPU 58 de-activates heating element 73 via relay 74, and re-activates heating element 73 when the air temperature falls below a certain predetermined lower value. In addition, thermostat 75 that contacts heating barrel 72 constantly monitors the temperature of heating barrel 72 and de-activates heating element 73 if a predetermined value is exceeded.

The heated air exiting heating barrel 72 travels through air-flow channel 36 in insert 34 of door 30, and then flows through the container within rotating heating chamber 80, thereby evenly heating the food product therein. CPU 58 continues the heating process for a fixed, predetermined time, or for a variable time by using the input signal from second temperature sensor 104 located at the air exit end of rotating chamber 80 as previously-described herein. Display 52 displays a bar graph which indicates the extent to which the food product has been heated. Meanwhile, the air exiting heating chamber 80 enters recirculation chamber 90, and is then directed by baffles 96 and 98 back into blower 68 via air inlet aperture 100 and shroud 81 to repeat the cycle. By re-circulating the heated air in this fashion, oven 10 is capable of heating food products much more rapidly than if the air was simply exhausted outside the oven.

In the preferred embodiment of oven 10, the air flow rate through the oven's ductwork system is monitored by air flow detection switch 102 which sends a signal to CPU 58 that indicates air is exiting from heating chamber 80. If the air flow fails to reach a certain predetermined value which might be caused by an obstruction in the ductwork system such as the operator failing to remove the overwrap from the container, or falls below a predetermined value which might be caused by the food product shifting in the container, then CPU 58 de-activates heating element 73, blower 68, and motor 94, and also causes display 52 to read an operator instruction such as "Woops—Remove Overwrap from Container".

When the fixed time has expired or the air exiting heating chamber 80 has reached the predetermined value, CPU 58 simultaneously de-activates heating element 73, blower 68, and motor 92, or in a preferred embodiment, de-activates heating element 73 and allows blower 68 to circulate unheated air around the food product container for a short period of time, e.g. 5 seconds, to cool down the which emits an audible sound indicating that the food product is done, and also displays on display 52 "Open Door—Remove Product". The operator then opens door 30, removes the container containing the now heated food product, and closes the door. Oven 10 is then ready to repeat the process.

Figure 11:
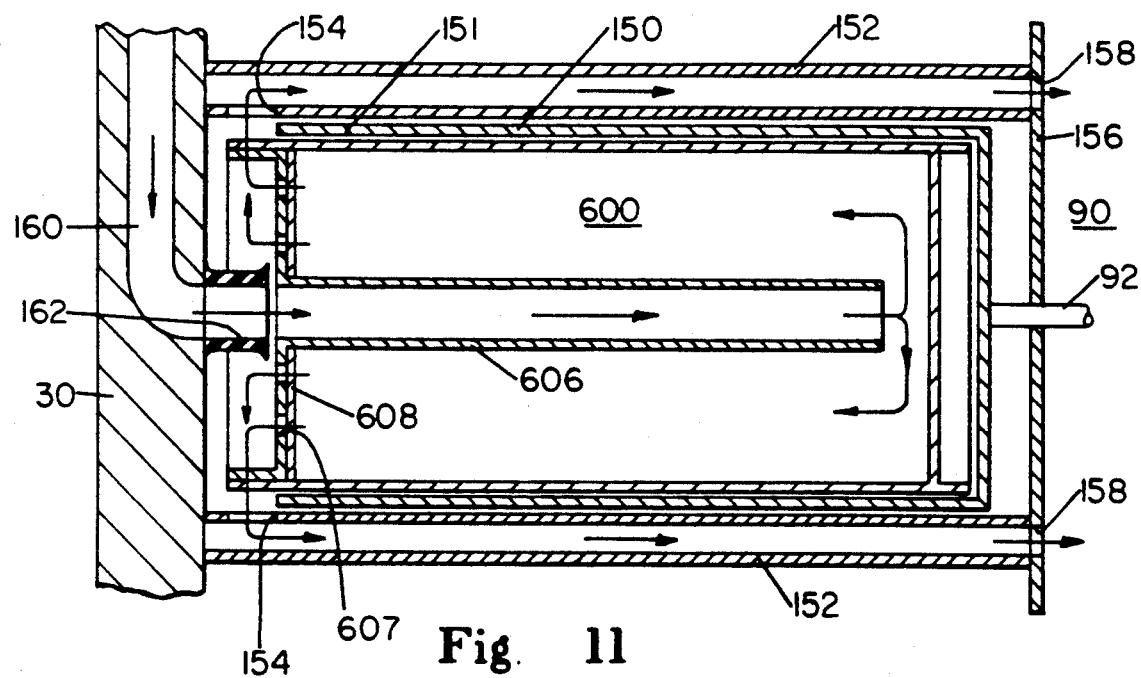
FIG. 11 is a schematic cross-sectional plan view of another embodiment of the oven apparatus of the present invention showing only the oven's heating chamber and portions of the oven's heated air recirculation system.

FIG. 11 is a schematic cross-sectional plan view of another embodiment of the oven apparatus of the present invention that uses a modified heating chamber and air return system. The oven's other components are essentially identical to those found in previously-described oven 10 and therefore a detailed description will not be repeated. In FIG. 11, heating chamber 150 is surrounded by air return manifold 152 which is provided with air inlet 154 located adjacent to container inlet end 151 of heating chamber 150. Air return manifold 152 terminates with plate 156 which is provided with aperture 158 to provide fluid communication between manifold 152 and recirculation chamber 90. Oven door 30 is provided with air-flow channel 160 that terminates with boot 162 which collectively provide fluid communication between heating barrel 72 and heating chamber 150.

Heating chamber 150 is adapted for use in heating a food product packaged inside a container such as container 600 illustrated in FIG. 22 and described later herein in greater detail. Briefly, in operation, heated air exiting from heating barrel 72 enters air-flow channel 160 in door 30 and is directed toward container 600 by boot 162. Container 600 is provided with air tube 606 depending from top end panel 605. Heated air exiting from boot 162 enters containers 600 and travels down through air tube 606 to the lower end of container 600. The heated air exiting air tube 606 strikes bottom end panel 604 and is reflected back through container 600, thereby heating the food product therein. The heated air then passes through filter 608, exits out through apertures 607 in top end panel 605, and is drawn into inlets 154 of air return manifold 152. From there, the heated air travels through air return manifold 152 and passes into air recirculation chamber 90 via aperture 158 in plate 156. As described earlier, the heated air entering recirculation chamber 90 is directed back into blower 68 to repeat the cycle.

Figure 12:
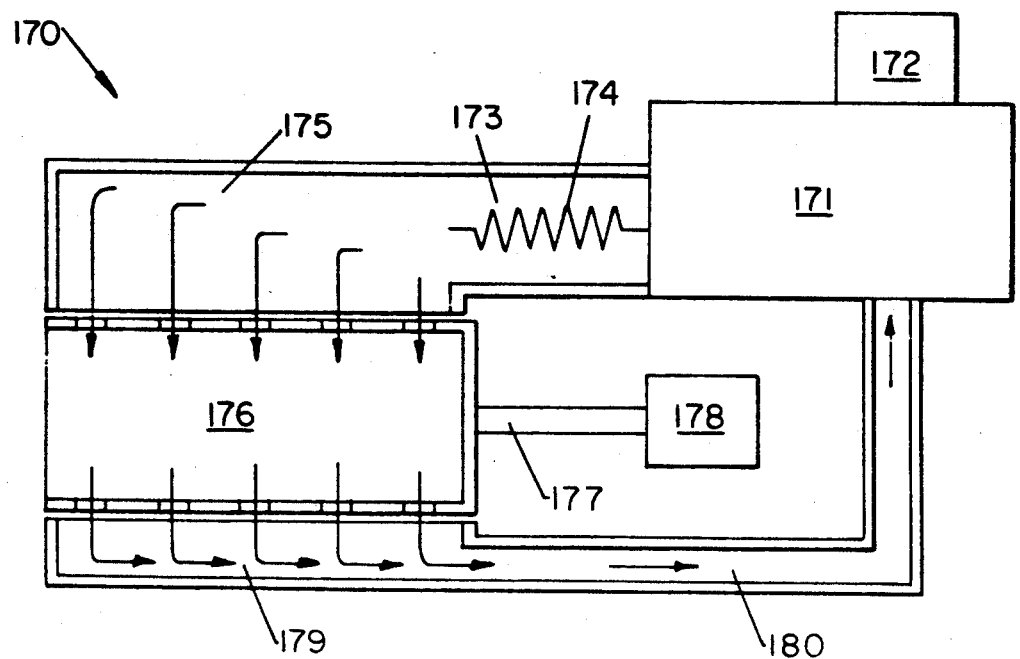
FIG. 12 is a schematic cross-sectional plan view of another embodiment of the oven apparatus of the present invention schematically showing only the oven's main internal components.
Figure 23:
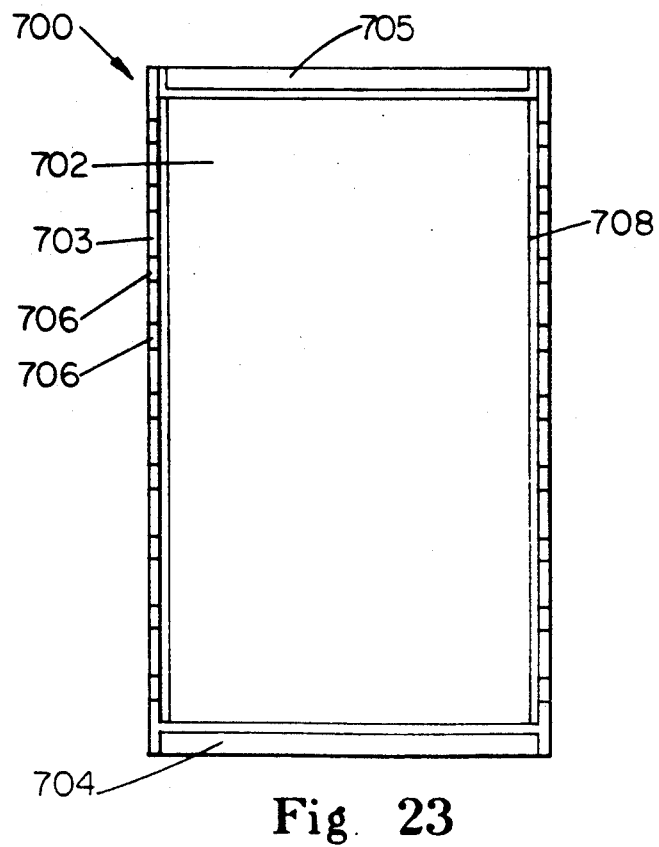
FIG. 23 is a cross-sectional side view of a food product container that is particularly adapted for use in the oven apparatus illustrated in FIG. 12.

FIG. 12 schematically represents the main internal components of another embodiment of an oven apparatus of the present invention generally indicated as 170. In FIG. 12, oven 170 includes blower 171 driven by motor 172, heating barrel 173 containing heating element 174 and being in fluid communication with blower 171, and air inlet manifold 175 in fluid communication with heating barrel 173. Heating chamber 176, which is preferably rotated by shaft 177 and motor 178, is located between air inlet manifold 175 and air exit manifold 179. Air inlet manifold 175, heating chamber 176, and air exit manifold 179 are all provided with a plurality of apertures to allow heated air from heating barrel 173 to pass from air inlet manifold 175, through heating chamber 176, and into air exit manifold 179. The food product container 700, which is described later herein in conjunction with FIG. 23, is provided with apertures in its body portion to allow heated air to pass therethrough, thereby heating the food product.

In operation, blower 171 directs the air heated by heating element 174 inside heating barrel 173 into air inlet manifold 175. From there, the heated air exits air inlet manifold 175 via the apertures therein and passes through the apertures in heating chamber 176 and container 700, thereby heating the food product therein. After the heated air has passed through container 700, it enters air exit manifold 179 and travels through duct 180 back to blower 171 to repeat the cycle.

Having described various embodiments of the oven of the present invention in detail, attention is now directed to FIGS. 13-23 and the followed detailed description of various embodiments of food product containers that are particularly adapted for use in heating various food products therein by utilizing the oven apparatuses of the present invention.

FOOD PRODUCT CONTAINER

FIGS. 13-16 show various views of one embodiment of a container which is particularly suited for use in heating a food product contained therein by utilizing oven apparatus 10 of the present invention previously described herein. In FIGS. 13-16, the container generally indicated as 300 has an overall configuration that is generally shaped complementary to that of the oven's heating chamber into which the container is to be inserted, e.g., tubular as illustrated. However, as noted previously herein, container 300 and the heating chamber into which it is intended to be inserted may be of any complementary shape.

Container 300 includes body portion 302 comprised of sidewall panel 303 that has bottom end panel 304 (FIG. 13) attached to its lower end. Bottom end panel 304 is preferably recessed, e.g. ¼ inch (0.64 cm), from the lowermost edge of sidewall panel 303 to prevent bottom end panel 304 from touching the surface of the article upon which container 300 is set, e.g., a tabletop, carseat, etc. Bottom end panel 304 has a plurality of apertures or vent holes 306 therethrough which allow heated air to pass through container 300 to heat the food product. In a particularly preferred embodiment, filter member 308 is adhered or otherwise attached to bottom end panel 304, preferably to its inner surface as shown, or to its outer surface. Filter member 308 can be made from a wide variety of materials that will trap a substantial portion of the fume particulates emitted from the food product during the heating operation and yet will allow heated air to readily pass therethrough. Examples of such materials include melt-blown or spun-bonded oleophilic thermoplastics such as polypropylene, polyethylene, polycarbonate, various nylons and various polyesters. Other suitable materials from which filter member 308 can be made include various woven and nonwoven fabrics, gauzes, cellulose paper elements, etc.

Referring back to FIG. 13, container 300 also includes top end panel 310 that is preferably removably attached to the upper end of body portion 302. One means for enabling top end panel 310 to be removably attached to body portion 302 is to provide top end panel 310 with depending peripheral flange 312 that friction or interference fits over the outside surface of upper end of body portion 302. As with bottom end panel 304, top end panel 310 is provided with a plurality of apertures or vent holes 314 that allow heated air to pass through container 300. In a preferred embodiment, filter member 316 is attached to top end panel 310, preferably its inner surface, which traps a substantial portion of the fume particulates emitted from the food product during the heating operation and yet allows the heated air to readily pass therethrough. Filter member 316 can be made from the same type of materials used in making filter member 308.

Figures 13, 14:
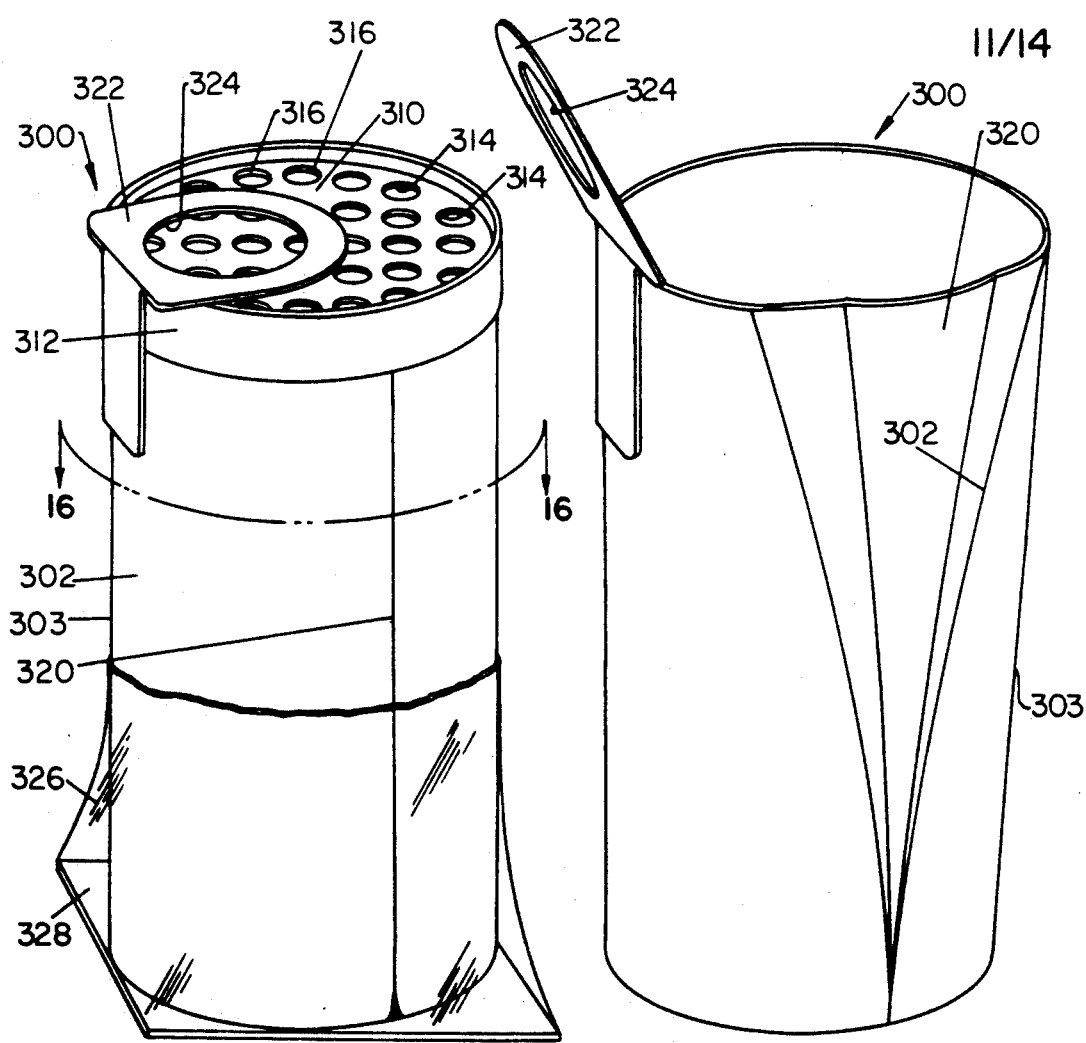
FIG. 13 is a perspective view of a container that is particularly adapted for heating a food product contained therein by utilizing the oven apparatus of the present invention.
FIG. 14 is a perspective view of the container illustrated in FIG. 13 shown with its top end panel removed and with its body portion expanded.
Figures 15, 16:
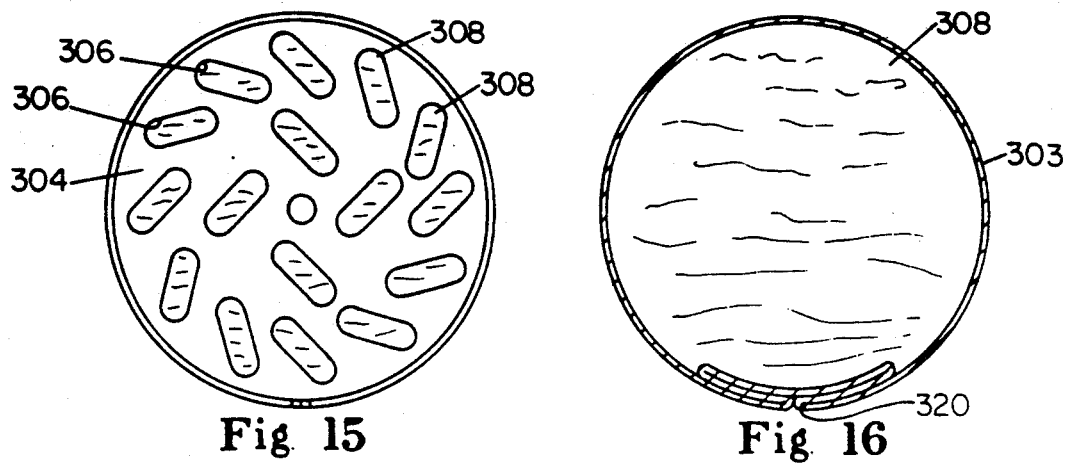
FIG. 15 is a bottom view of the container illustrated in FIG. 13.
FIG. 16 is a top plan view of the container illustrated in FIG. 13 shown with its top end panel removed.

In a preferred embodiment, body portion 302 of container 300 is provided with pleat 320 that runs longitudinally within body portion 302. Before top end panel 310 is removed from container 300 as shown in FIG. 13, pleat 320 is folded tightly onto itself as shown in FIG. 16 such that container 300 exhibits a substantially circular cross-section. After the food product has been heated and top end panel 310 removed from container 300, pleat 320 can be manually unfolded as shown in FIG. 14 to expand container 300 into a cone-like structure which allows the consumer to gain easy access to the food product located in the lower section of container 300.

In another particularly preferred embodiment, container 300 is provided with grasping tab 322 that is adhered or otherwise attached to body portion 302, or integrally formed with body portion 302. Tab 322 preferably includes aperture 324 which allows a consumer to insert his/her finger therein to withdraw container 300 from the oven's heating chamber after the heating operation is complete. Tab 322 is preferably made from a flexible material to allow it to be unfolded from its storage position shown in FIG. 13 to its grasping position as shown in FIG. 14.

After container 300 has been assembled and charged with a predetermined quantity of a food product, container 300 is preferably wrapped within outer protective wrap 326, e.g., a thin film of heat-shrinkable thermoplastic material as shown in FIG. 13. Wrap 326 serves the important function of protecting container 300 and the food product therein from environmental factors such as air and moisture during transportation and storage. Of course, it is necessary for wrap 326 to be removed from container 300 before it is placed within the oven's heating chamber, and printed instructions on container 300 that so note are preferably provided. In addition, container 300 may be provided with bottom end cap 328 and a similar top end cap (not shown) that loosely rest on bottom end panel 304 and top end panel 310, respectively, and are held in place by being within wrap 326. Both bottom end cap 328 and the top end cap are larger than the cross-section of the oven's heating chamber to ensure that the end caps and wrap 326 are removed from container 300 before it is inserted into the oven's heating chamber.

FIGS. 17-20 show various views of another preferred embodiment of a container which is particularly suited for use in heating a food product contained therein by utilizing the oven apparatus of the present invention previously described herein. In FIGS. 17-20, the container generally indicated as 400 also has an overall configuration that is generally shaped complementary to that of the oven's heating chamber into which the container is to be inserted, e.g., tubular as illustrated. Container 400 includes body portion 402 comprised of sidewall panel 403, and top end panel 404 and bottom end panel 406 (FIG. 16) that are attached to the upper end and lower end, respectively, of body portion 402. Both top end panel 404 and bottom end panel 406 are provided with a plurality of large apertures 408, e.g., four quarter-circle apertures as illustrated, and have filter member 410 attached to their respective inner surfaces.

Referring to FIG. 19 in conjunction with FIGS. 17 and 18, filter member generally indicate as 410 is a three-dimensional, baffle-type filter that includes upper filter element 412 and lower filter element 414, each being constructed from a corrugated material having a corrugated medium or flutes 416, and an outer liner paper 418. In making filter member 410, a plurality of wedge-shaped apertures 420 are cut in filter elements 412 and 414, then the two elements are rotated 90° with respect to each other such that flutes 416 of one filter element runs substantially perpendicular to flutes 416 of the other filter element. It has been found that this type of filtering element provides a very high volumetric air flow rate while at the same time provides an effective means for trapping a substantial portion of the liquid and particulate fumes generated during the food product heating process.

Referring now to FIGS. 17 and 20, sidewall panel 403 of container 400 is provided with line of weakness 422 that extends around the perimeter of body portion 402 and is preferably angled at approximately 45° with respect to the horizontal. Line of weakness 422 may consist of, for example, a series of small perforations or a score line. Line of weakness 422 provides a means for a consumer to conveniently open container 400 to gain access to the heated food product by pressing along weakness line 422 to initiate a separation, and then pulling upper section 424 of body portion 402 away from lower section 426 of body portion 402 until container 400 is fully opened to expose food product FP as shown in FIG. 20.

In a particularly preferred embodiment, container 400 is also provided with grasping tab 428 that is attached to the upper end of body portion 402. Tab 428, which preferably includes finger aperture 430, provides a means for a consumer to conveniently withdraw container 400 from the oven's heating chamber after the heating process is complete. Tab 428 is preferably made from a flexible material to allow it to be unfolded from its storage position shown in FIG. 16 to its grasping position as shown in FIG. 20.

As with previously-described container 300, after container 400 has been assembled and charged with a predetermined quantity of a food product, container 400 is preferably wrapped within outer protective wrap 432, e.g., a thin film of heat-shrinkable thermoplastic material. Wrap 434 serves the important function of protecting container 400 and the food product therein from environmental factors such as air and moisture during transportation and storage.

Figure 21:
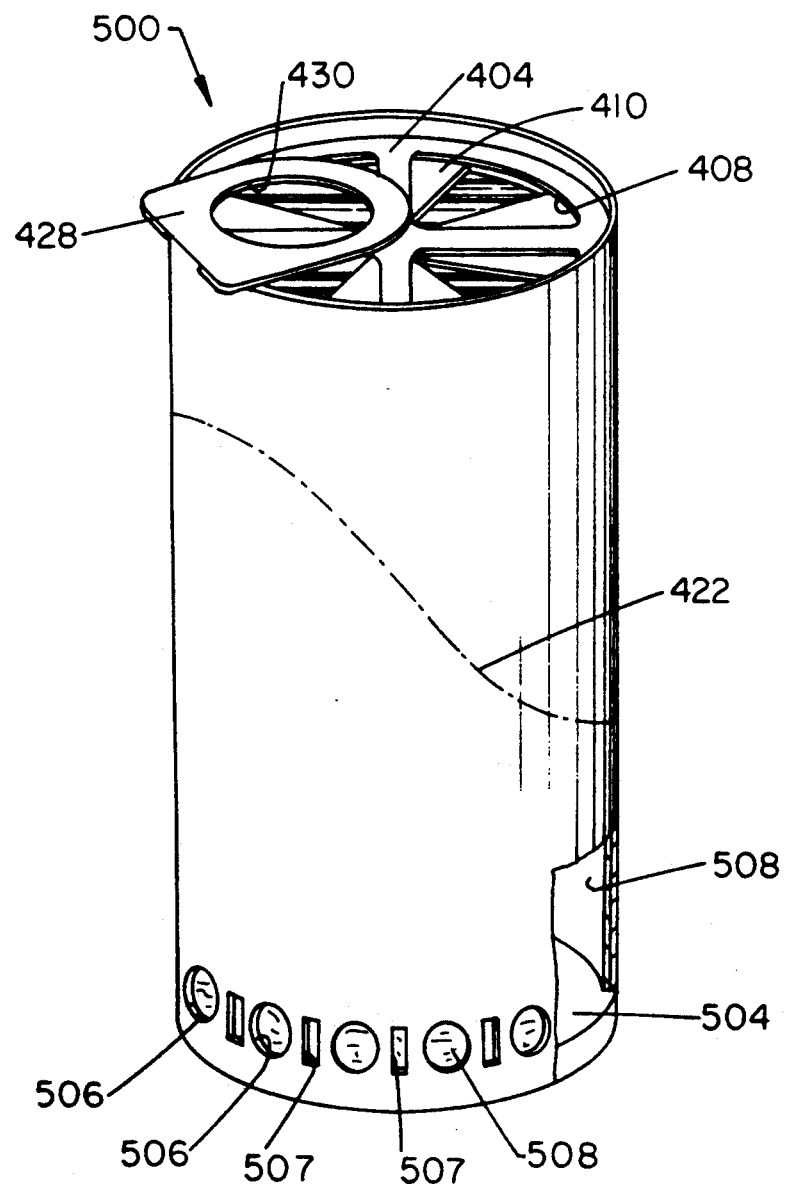
FIG. 21 is a perspective view of another preferred container that is particularly adapted for heating a food product contained therein by utilizing the oven apparatus of the present invention.

FIG. 21 illustrates yet another preferred container generally indicated as 500 that is particularly suited for heating a food product therein by utilizing previously-described oven apparatus 10 of the present invention. In FIG. 21, container 500 is substantially identical to previously-described container 400 except that it has imperforate bottom end panel 504 and a plurality of apertures 506 and/or slots 507 through sidewall panel 503 located at the lower end of body portion 502. Filter element 508 is attached to the inner surface of sidewall panel 503 such that it covers apertures 506/slots 507 to filter the air passing therethrough. Apertures 506 and/or slots 507 in sidewall panel 503 cooperate with large apertures 408 in top end panel 404 in providing the means for allowing heated air to pass through container 500 while container 500 is within heating chamber 80 of oven 10.

Figure 22:
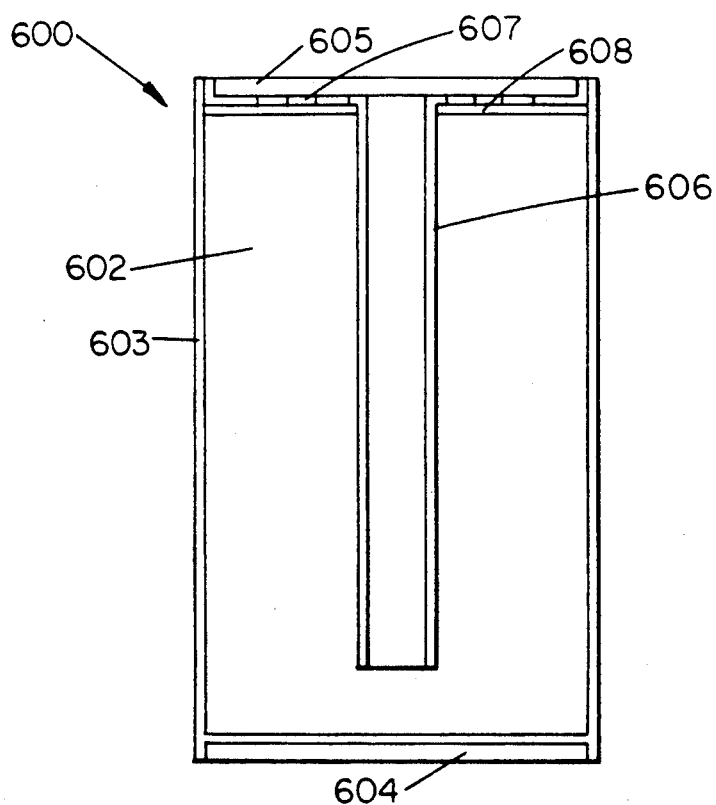
FIG. 22 is a cross-sectional side view of a food product container that is particularly adapted for use in the oven apparatus illustrated in FIG. 11.

FIG. 22 illustrates another preferred container generally indicated as 600 that is particularly suited for heating a food product therein by utilizing previously-described oven apparatus 10 that has a modified heating chamber and air return system as illustrated in FIG. 11. In FIG. 22, container 600 includes body portion 602 comprised of sidewall panel 603 that has bottom end panel 604 attached to its lower end, and top end panel 605 attached to its upper end. Air inlet tube 606 is attached to and depends from the inner surface of top end panel 605, and extends into body portion 602 until it terminates near the bottom of body portion 602. Top end panel 605 is provided with a plurality of apertures 607 which allow heated air to escape from container 600 after heated air has traveled into the container via air inlet tube 606 as described earlier herein. In a preferred embodiment, filter element 608 is attached to the inner surface of top panel 605.

FIG. 23 illustrates another preferred container generally indicated as 700 that is particularly suited for heating a food product therein by utilizing previously-described oven apparatus 170 illustrated in FIG. 12. In FIG. 23, container 700 includes body portion 702 comprised of sidewall panel 703 that has bottom end panel 704 attached to its lower end, and top end panel 705 attached to its upper end. Sidewall panel 703 has a plurality of apertures 706 therethrough to allow heated air to pass through the container as described earlier herein, thereby heating the food product. Filter element 708 is preferably attached to the inner surface of sidewall panel 703.

The previously-described containers adapted for use with ovens of the present invention can be constructed from a wide variety of materials. For example, the body portions of these containers can be made from 2 ply (10-12 mil, 0.25-0.30 mm) Strathmore cylinder paperboard that is preferably lined with a thin layer of aluminum foil to substantially prevent the outer paperboard material from absorbing any liquids released from the food during heating, and also to crisp the outer surface of the food product. Alternatively, the body portions can be lined with liquid-absorbing materials that soak up any liquids released from the food product during the heating operation. The top and bottom end panels of the containers can be made from 20 point (20 mil, 0.51 mm) solid bleached sulfate (SBS) cartonboard or 3 ply (18-20 mil, 0.46-0.51 mm) Strathmore cylinder paperboard.

As noted previously herein, the ovens and containers of the present invention can be used to heat and/or cook a virtually limitless variety of food products. One type of food product that heats up extremely well by using the ovens and containers of the present invention is pre-cooked french fries such as those disclosed in U.S. Pat. Nos. 4,570,080 and 4,761,294, which are incorporated herein by reference. Generally speaking, french fries are parallelpiped in shape and are anywhere from about 1-5 inches (2.5-12.7 cm) long. It has been found that good heating results are obtained if the path of the oven's heated air is parallel to the longitudinal axes of the french fries; accordingly, the fries are preferably packaged within the container such that their longitudinal axes are parallel to the container's longitudinal axis as shown in FIG. 20. Packaging the fries in this fashion is also the most efficient use of the available container volume.

While several particularly preferred embodiments of the present invention have been described and illustrated, it will now be apparent to those skilled in the art that various changes and modifications can be made thereto without departing from the spirit and scope of the invention. Accordingly, the following claims are intended to embrace such changes and modifications.

What is claimed is:

1. A method of heating a packaged food product in an oven that generates a stream of heated air and has a heating chamber of predetermined cross-section, said packaged food product comprising a single use ovenable container exhibiting a predetermined cross-section which is substantially complementary to the cross-section of said heating chamber in said oven and having a longitudinal axis and means for enabling a stream of air to pass longitudinally therethrough, said container including a plurality of food pieces which are sufficiently loosely disposed in said container that they will tumble when said container is rotated about said axis, said method comprising the steps of:
   (a) inserting said single use ovenable container exhibiting a cross-section substantially complementary to the cross-section of said heating chamber into said heating chamber of said oven so as to substantially fill the cross-section of said heating chamber with said container;
   (b) rotating said container about said longitudinal axis to effect tumbling of said food pieces inside said container;
   (c) heating a stream of air; and
   (d) passing substantially all of said stream of heated air longitudinally through said means for enabling said stream of air to pass through said container while said container is being rotated, thereby heating said food pieces disposed in said container.

2. The method recited in claim 1 wherein said stream of heated air is directed through said container for a predetermined period of time.

3. The method recited in claim 1 further comprising the steps of measuring the temperature of said stream of heated air after it exits said container, and continuing to direct said stream of heated air through said container as long as said measured temperature remains below a predetermined value.

4. The method recited in claim 1 further comprising the steps of measuring the temperature of said stream of heated air before it enters said container, and ceasing to direct said stream of heated air through said container if said measured temperature exceeds a predetermined value.

5. The method recited in claim 1 further comprising the steps of measuring the amount of heat energy absorbed by said food product, and ceasing to direct said stream of heated air through said container when the amount of said absorbed heat energy reaches a predetermined value.

6. The method recited in claim 1 further comprising the steps of measuring the flow rate of said stream of heated air passing through said container, and stopping steps (b) and (c) if said flow rate fails to rise above or subsequently falls below a predetermined value.

7. A method of heating a packaged food product which packaged food product comprises a single use ovenable container having a longitudinal axis and means for enabling a stream of air to pass longitudinally therethrough, said container including a plurality of food pieces which are sufficiently loosely disposed in said container that they will tumble when said container is rotated about said axis, said method comprising the steps of:
   (a) rotating said container about said longitudinal axis to effect tumbling of said food pieces inside said container;
   (b) heating a stream of air;
   (c) passing substantially all of said stream of heated air longitudinally through said means for enabling said stream of air to pass through said container while said container is being rotated thereby heating said food pieces disposed in said container; and
   (d) trapping materials emitted from said food pieces into said stream of heated air in said single use container before said stream of heated air issues from said container.

8. The method recited in claim 7 wherein said stream of heated air is directed through said container for a predetermined period of time.

9. The method recited in claim 7 further comprising the steps of measuring the temperature of said stream of heated air after it exits said container, and continuing to direct said stream of heated air through said container as long as said measured temperature remains below a predetermined value.

10. The method recited in claim 7 further comprising the steps of measuring the temperature of said stream of heated air before it enters said container, and ceasing to direct said stream of heated air through said container if said measured temperature exceeds a predetermined value.

11. The method recited in claim 7 further comprising the steps of measuring the amount of heat energy absorbed by said food product, and ceasing to direct said stream of heated air through said container when the amount of said absorbed heat energy reaches a predetermined value.

12. The method recited in claim 7 further comprising the steps of measuring the flow rate of said stream of heated air passing through said container, and stopping steps (b) and (c) if said flow rate fails to rise above or subsequently falls below a predetermined value.

13. A method of heating a packaged food product in an oven that generates a stream of heated air and has a heating chamber of predetermined cross-section, said packaged food product being substantially sealed to the surrounding environment when shipped to the end user, said package comprising a single use ovenable container exhibiting a predetermined cross-section which is substantially complementary to the cross-section of said heating chamber in said oven and having means for enabling a stream of air to pass therethrough, said container including a plurality of food pieces which are sufficiently loosely disposed in said container that they will tumble when said container is rotated, said method comprising the steps of:
   (a) opening said sealed package containing said food product sufficiently to enable a stream of air to pass longitudinally through said container;
   (b) inserting said single use ovenable container exhibiting a cross-section substantially complementary to the cross-section of said heating chamber into said heating chamber of said oven so as to substantially fill the cross-section of said heating chamber with said container;
   (c) heating a stream of air;
   (d) rotating said container to effect tumbling of said food pieces inside said container; and (e) passing substantially all of said stream of heated air longitudinally into and through said container to effect substantially even heating throughout said food pieces.

14. The method of claim 13 further comprising the step of filtering said stream of heated air as it is directed into said container to obviate contamination of said food pieces by foreign materials entrained in said stream of heated air.

15. A method of heating a packaged food product which packaged food product is sealed when shipped and which comprises an ovenable container having means for enabling a stream of air to pass therethrough, and a plurality of food pieces which are sufficiently loosely disposed in said container that they will tumble when said container is rotated, said method comprising the steps of:
   (a) opening said packaged food product sufficiently to enable a stream of air to pass through said container;
   (b) heating a stream of air;
   (c) rotating said container to effect tumbling of said food pieces inside said container;
   (d) directing said stream of heated air into and through said container while rotating the container to effect substantially even heating throughout said food pieces; and
   (e) trapping materials emitted from said food pieces into said stream of heated air before said stream of heated air issues from said container.

16. The method of claim 15 further comprising the step of filtering said stream of heated air as it is directed into said container to obviate contamination of said food pieces by foreign materials entrained in said stream of heated air.

17. The method of claim 13 or 15 wherein said container has a longitudinal axis, said means for enabling a stream of air to pass therethrough comprises means for enabling said stream of air to pass only longitudinally through said container, and said food pieces are elongate, said method comprising rotating said container about said longitudinal axis, and orienting said container with said longitudinal axis sufficiently close to horizontal that said food pieces extend longitudinally within said container during said tumbling.

18. A method of heating a packaged food product in an oven that generates a stream of heated air and has a heating chamber of predetermined cross-section and then serving the packaged food product, said packaged food product comprising a single use ovenable container exhibiting a predetermined cross-section which is substantially complementary to the cross-section of said heating chamber in said oven and having means for enabling a stream of air to pass longitudinally therethrough, said container including a plurality of food pieces which are sufficiently loosely disposed in said container that they will tumble, when said container is rotated, said container also comprising a tear line for dividing said container into a serving receptacle which is large enough to hold said food pieces, and a removable portion, said method comprising the steps of:
   (a) inserting said single use ovenable container exhibiting a cross-section substantially complementary to the cross-section of said heating chamber into said heating chamber of said oven so as to substantially fill the cross-section of said heating chamber with said container;
   (b) heating a stream of air;
   (c) rotating said container to effect tumbling of said food pieces inside said container;
   (d) passing substantially all of said stream of heated air longitudinally through said rotating container to effect substantially even heating of said food pieces to a predetermined temperature; and then
   (e) dividing said single use container along said tear line into a serving receptacle containing said food pieces, and a removable portion.

19. The method of claim 18 further comprising the step of
   opening said container sufficiently to expose said means for enabling said stream of heated air to pass longitudinally through said container.

20. A method of heating and serving a packaged food product which packaged food product comprises a single use ovenable container having means for enabling a stream of air to pass therethrough, said container including a plurality of food pieces which are sufficiently loosely disposed in said container that they will tumble when said container is rotated, said container also comprising a tear line for dividing said container into a serving receptacle which is large enough to hold said food pieces, and a removable portion, said method comprising the steps of:
   (a) heating a stream of air;
   (b) rotating said container to effect tumbling of said food pieces inside said container;
   (c) passing substantially all of said stream of heated air through said rotating container to effect substantially even heating of said food pieces to a predetermined temperature;
   (d) trapping materials emitted from said food pieces into said stream of heated air in said single use container before said stream of heated air issues from said container; and
   (e) dividing said container along said tear line into a serving receptacle containing said food pieces, and a removable portion.

21. The method of claim 20 wherein said container has a longitudinal axis, said means for enabling a stream of air to pass therethrough comprises means for enabling said stream of air to pass only longitudinally through said container, and said food pieces are elongate, said method comprising rotating said container about said longitudinal axis, and orienting said container with said longitudinal axis sufficiently close to horizontal that said food pieces extend longitudinally within said container during said tumbling.

* * * * *

UNITED STATES PATENT AND TRADEMARK OFFICE
CERTIFICATE OF CORRECTION

PATENT NO. : 5,154,940
DATED : October 13, 1992
INVENTOR(S) : W. James Budzyna, et al It is certified that error appears in the above-indentified patent and that said Letters Patent is hereby corrected as shown below:

Column 10, line 35, "T3" should read --
$$\text{Heat} = K_1 \int (T_i - T_e) \, dt - k_2 \int (T_i - T_e) \, dt \,.$$

Column 12, line 10, after "the" insert -- "container's outer surface. CPU 58 then sends a signal to buzzer 106" --.

line 51, "434" should read -- 432 --.

Signed and Sealed this

Twenty-eighth Day of December, 1993

Attest:

BRUCE LEHMAN

*Attesting Officer*　　　　*Commissioner of Patents and Trademarks*